(12) United States Patent
Tanaka et al.

(10) Patent No.: US 8,988,784 B2
(45) Date of Patent: Mar. 24, 2015

(54) ZOOM LENS AND IMAGING APPARATUS

(71) Applicant: FUJIFILM Corporation, Tokyo (JP)

(72) Inventors: Takashi Tanaka, Saitama-ken (JP); Michio Cho, Saitama-ken (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 14/094,812

(22) Filed: Dec. 3, 2013

(65) Prior Publication Data

US 2014/0085734 A1    Mar. 27, 2014

Related U.S. Application Data

(63) Continuation of application No. PCT/JP2012/003987, filed on Jun. 19, 2012.

(30) Foreign Application Priority Data

Jun. 21, 2011   (JP) ................................ 2011-137061

(51) Int. Cl.
  *G02B 15/14*   (2006.01)
  *G02B 15/173*  (2006.01)
  *G02B 27/64*   (2006.01)

(52) U.S. Cl.
  CPC .............. *G02B 15/14* (2013.01); *G02B 15/173* (2013.01); *G02B 27/646* (2013.01)
  USPC .......................................... 359/684; 359/683

(58) Field of Classification Search
  CPC ....... G02B 15/14; G02B 15/20; G02B 15/173
  USPC ........................................... 359/676, 683, 684
  See application file for complete search history.

(56) References Cited

U.S. PATENT DOCUMENTS

| 5,185,678 A | 2/1993 | Arimoto |
| 5,872,659 A | 2/1999 | Kohno |
| 6,010,537 A | 1/2000 | Konno et al. |
| 6,061,186 A | 5/2000 | Nishio |

FOREIGN PATENT DOCUMENTS

| JP | 04-70707 | 3/1992 |
| JP | 09-197271 | 7/1997 |
| JP | 10-206736 | 8/1998 |
| JP | 11-064728 | 3/1999 |
| JP | 2011-090190 | 5/2011 |

OTHER PUBLICATIONS

NPL English-Language Translation of International Preliminary Report on Patentability (PCT/IEPA/409) prepared for PCT-JP2012-003987 on Dec. 21, 2013.*

(Continued)

*Primary Examiner* — David N Spector
(74) *Attorney, Agent, or Firm* — Young & Thompson

(57) ABSTRACT

A zoom lens substantially consists of, in order from the object side, a positive first lens group, a negative second lens group, a positive third lens group, a positive fourth lens group, and a negative fifth lens group. When varying magnification, the distances between adjacent lens groups are changed, while all of the lens groups are moved with respect to an image formation position. When focusing, only the fifth lens group is shifted. The fifth lens group has at least one negative lens and at least one positive lens.

11 Claims, 16 Drawing Sheets

(56) References Cited

OTHER PUBLICATIONS

NPL English-Language Translation of PCT-JP2012-003987 as originally filed on Jun. 19, 2012.*

International Search Report PCT/JP2012/003987 with English Translation dated Oct. 2, 2012.

* cited by examiner

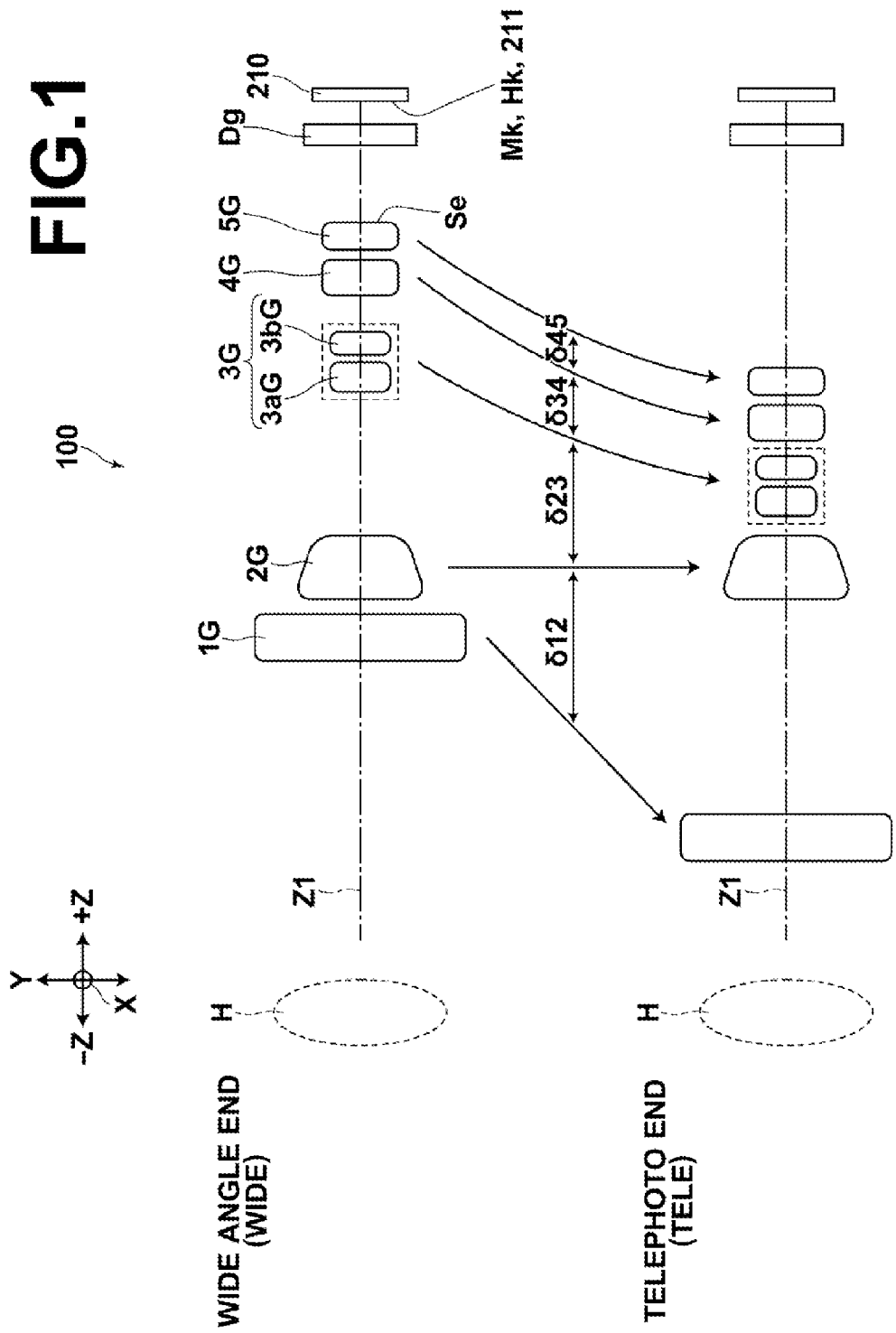

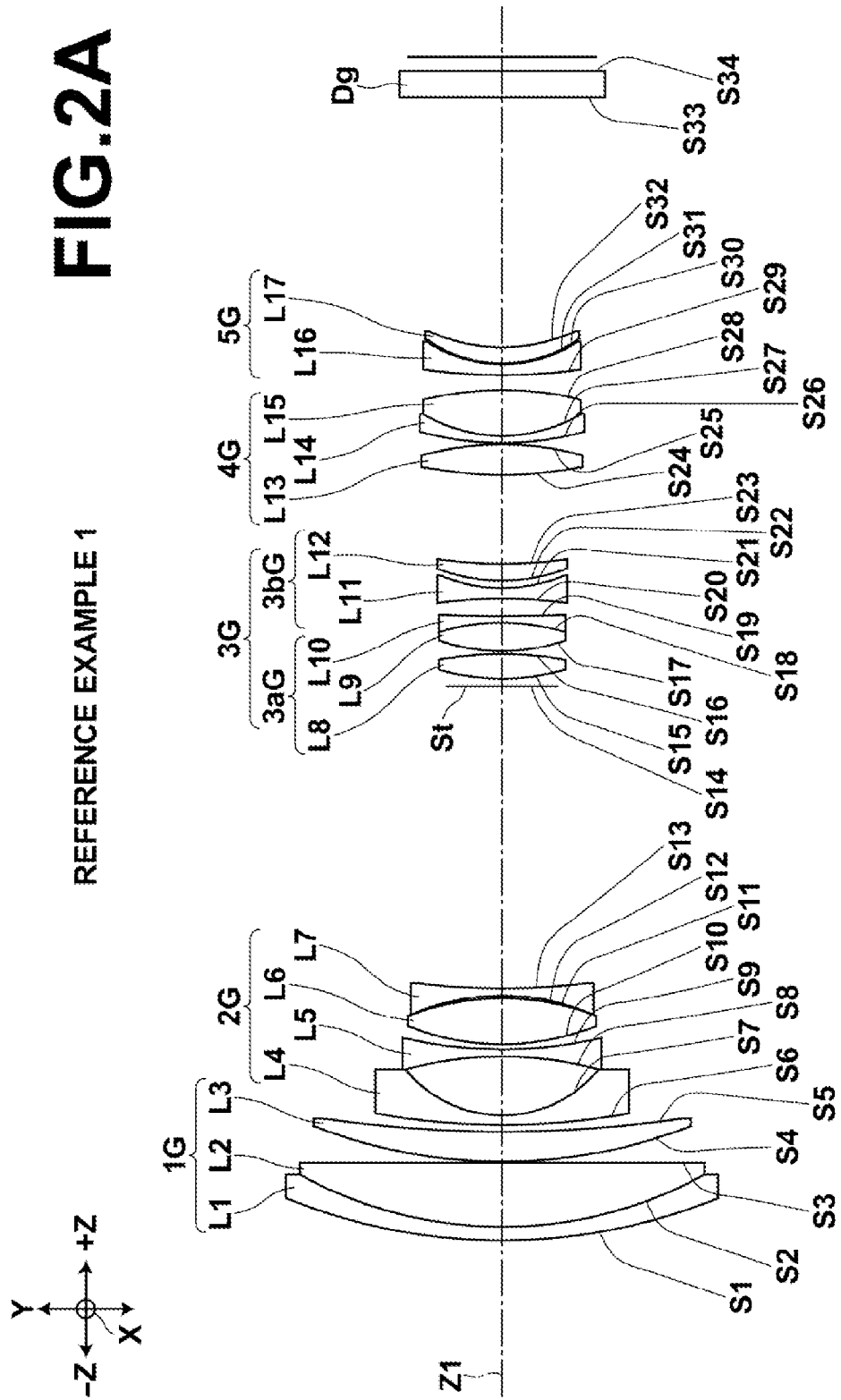

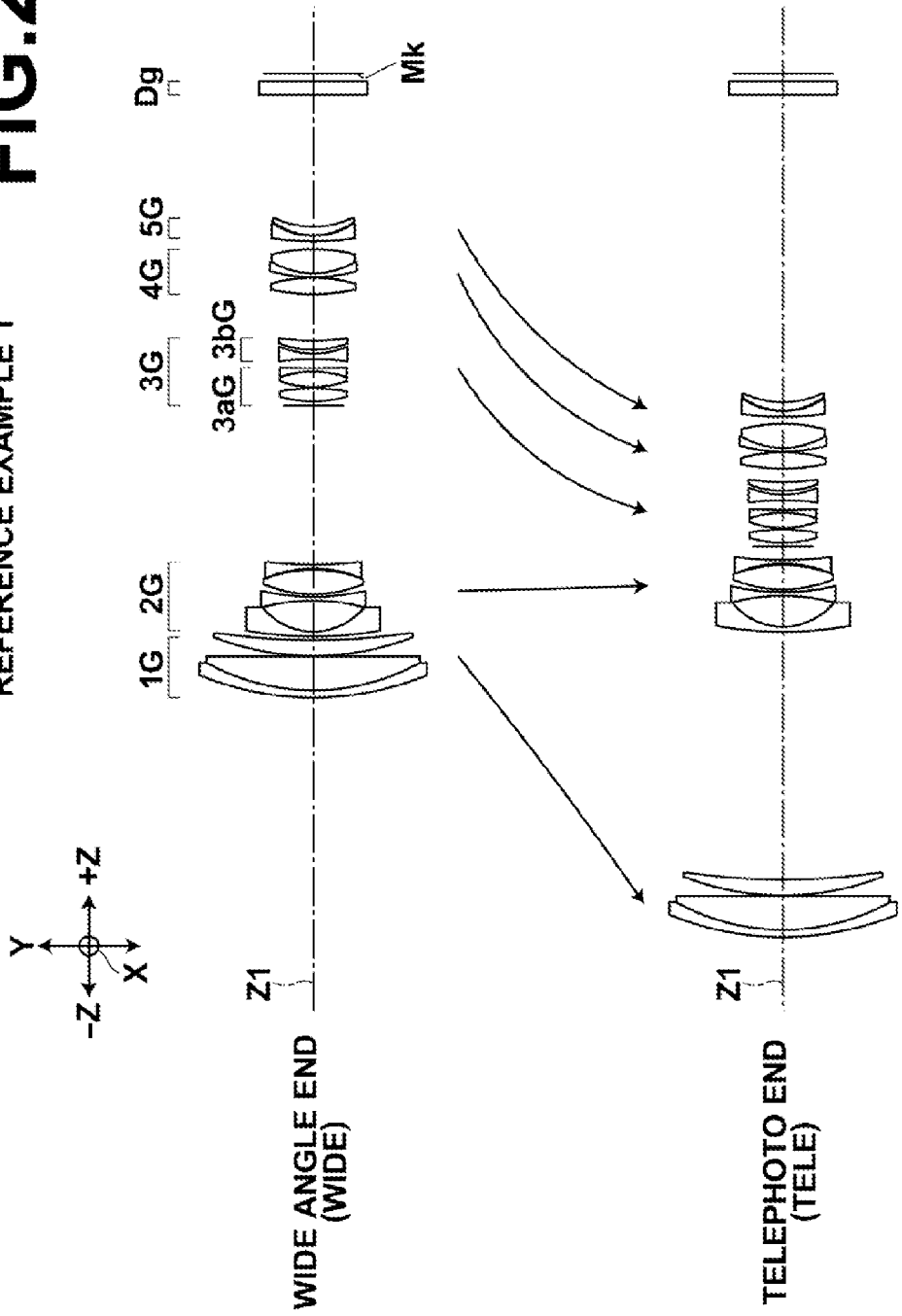

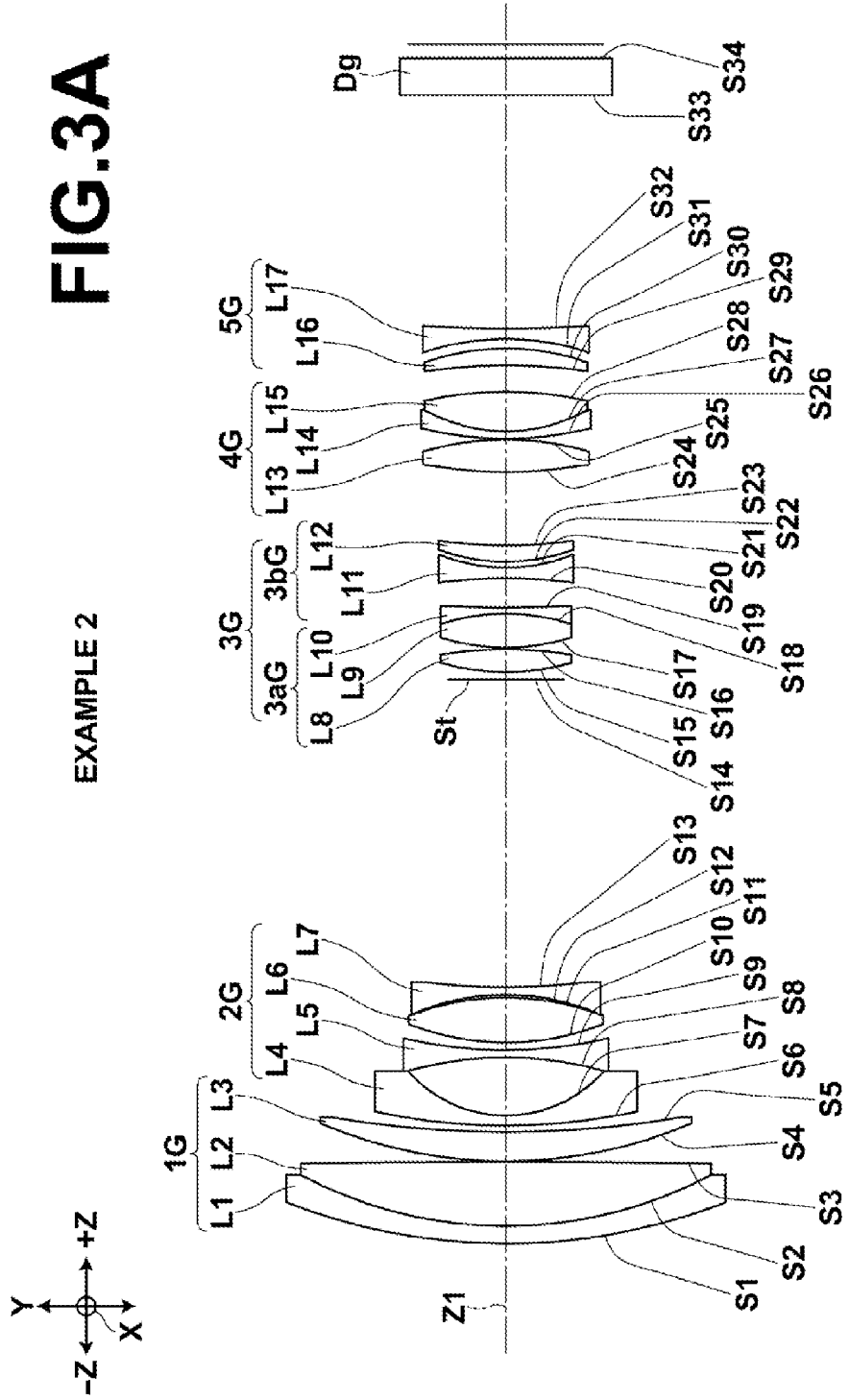

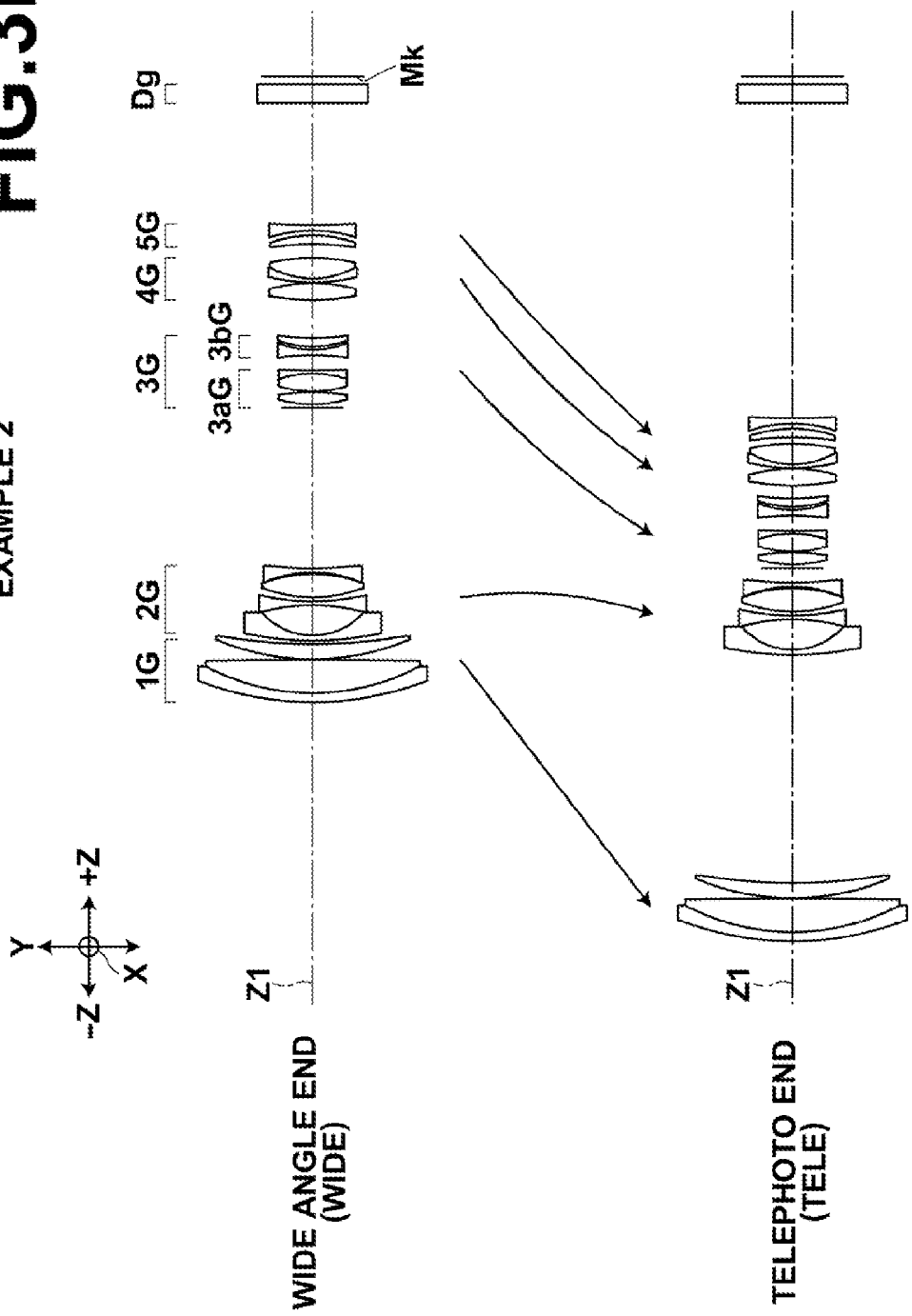

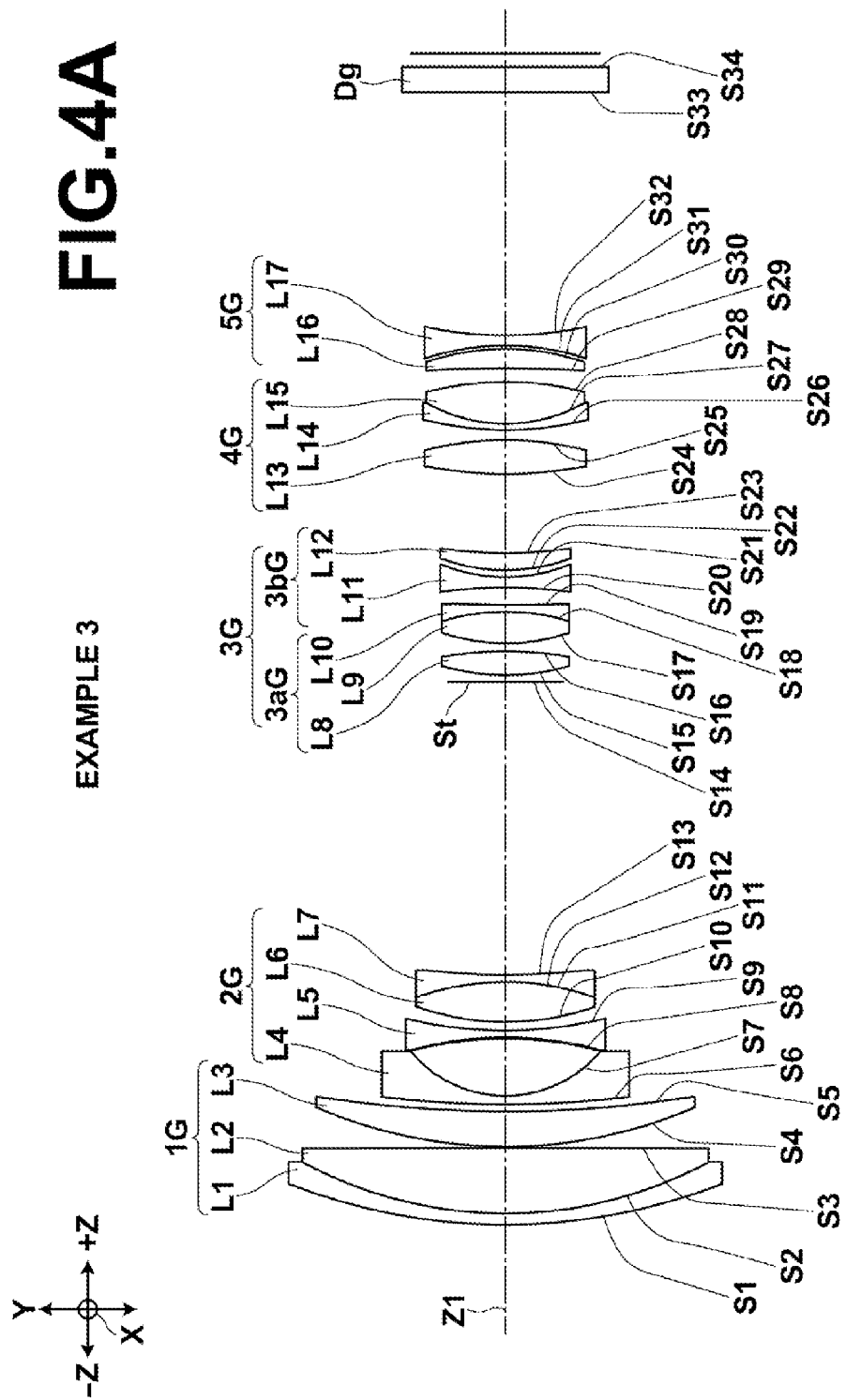

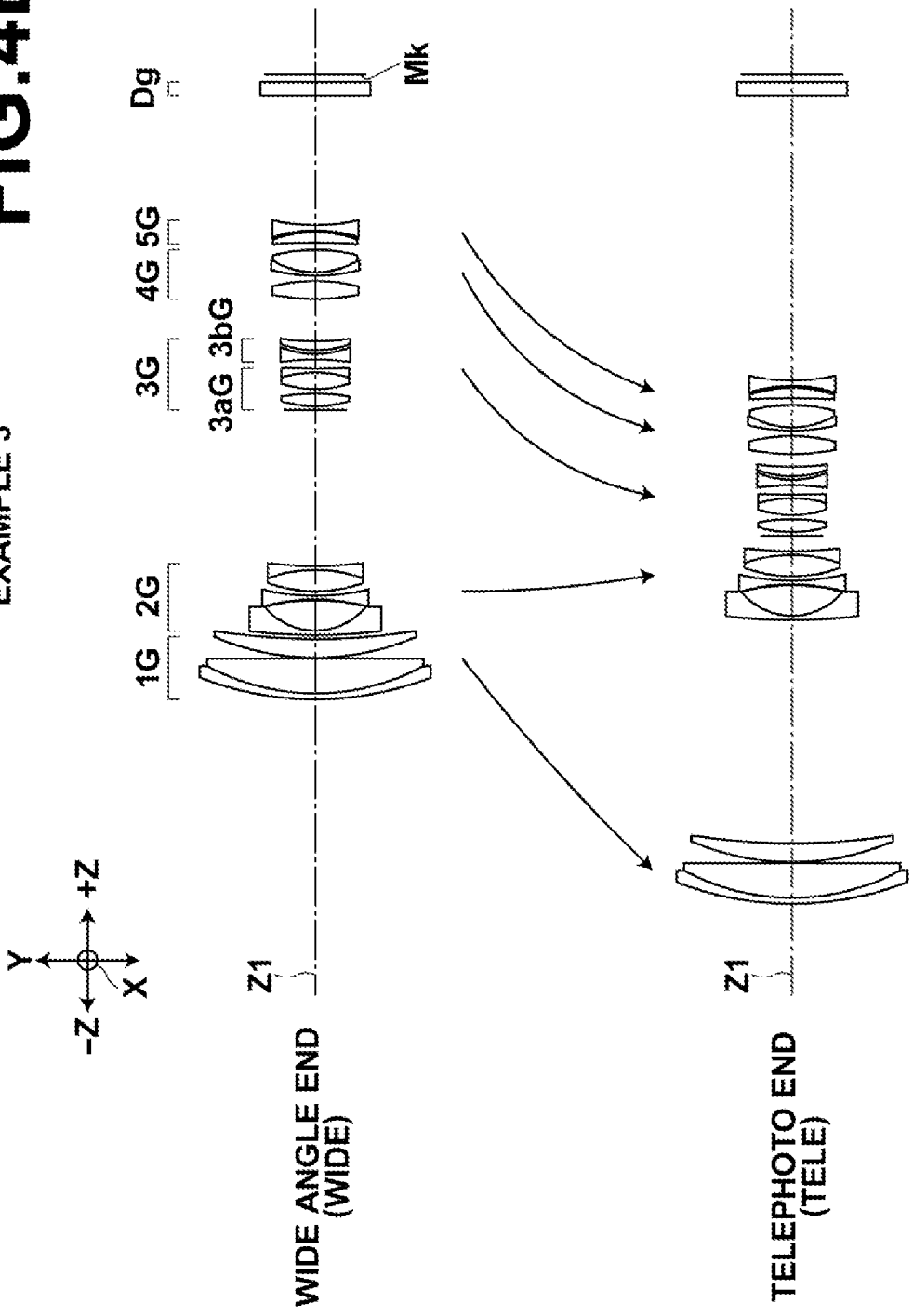

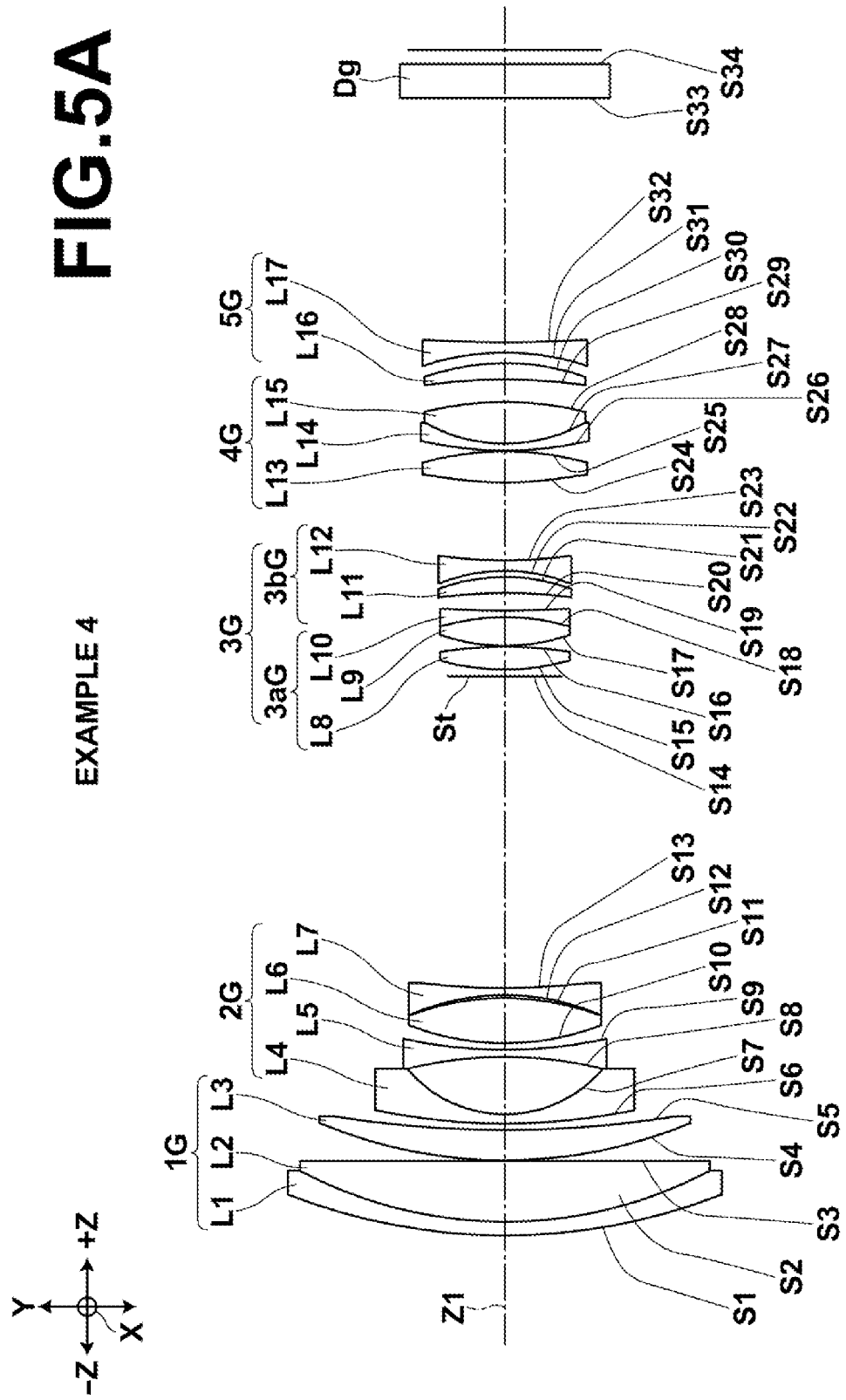

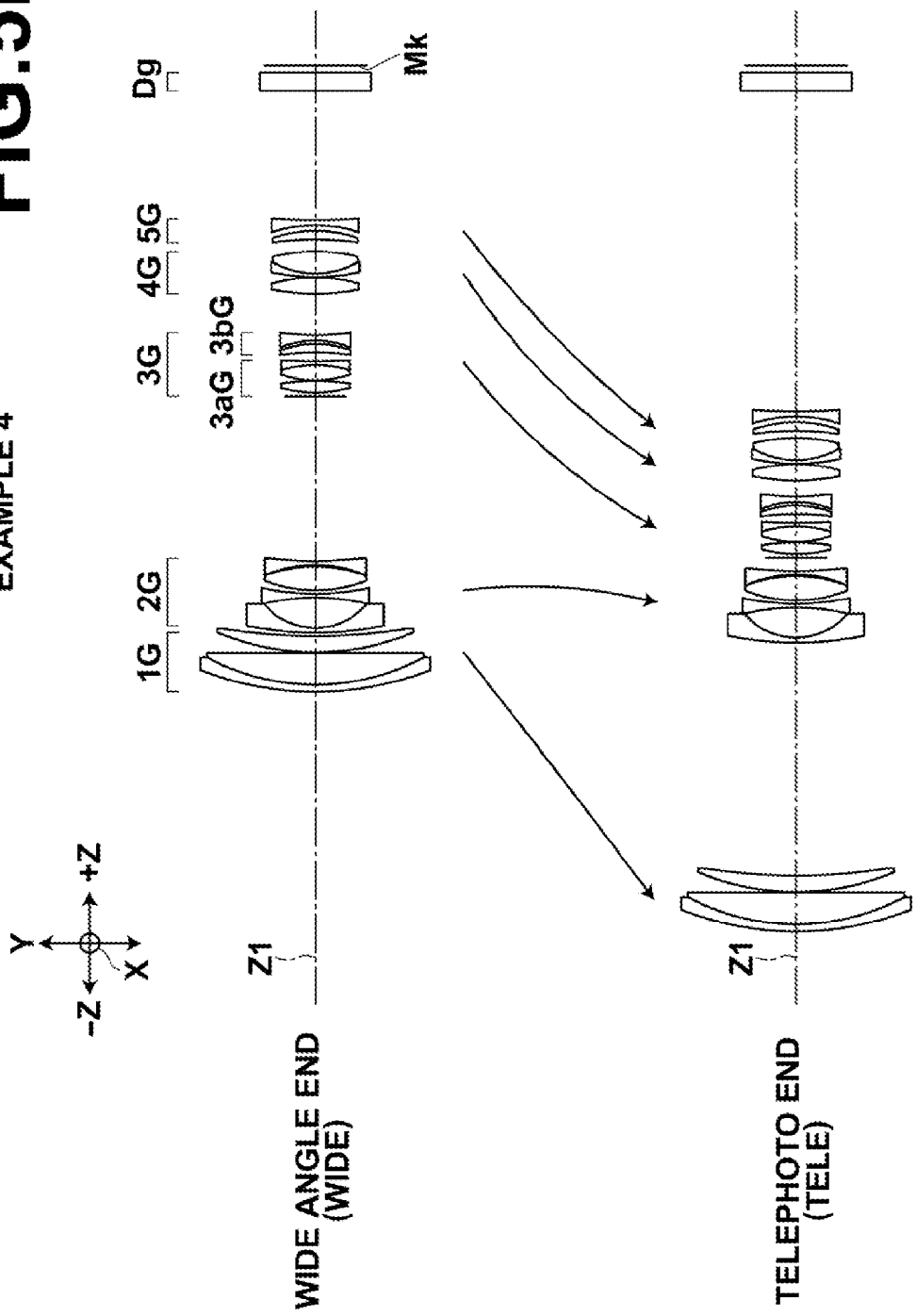

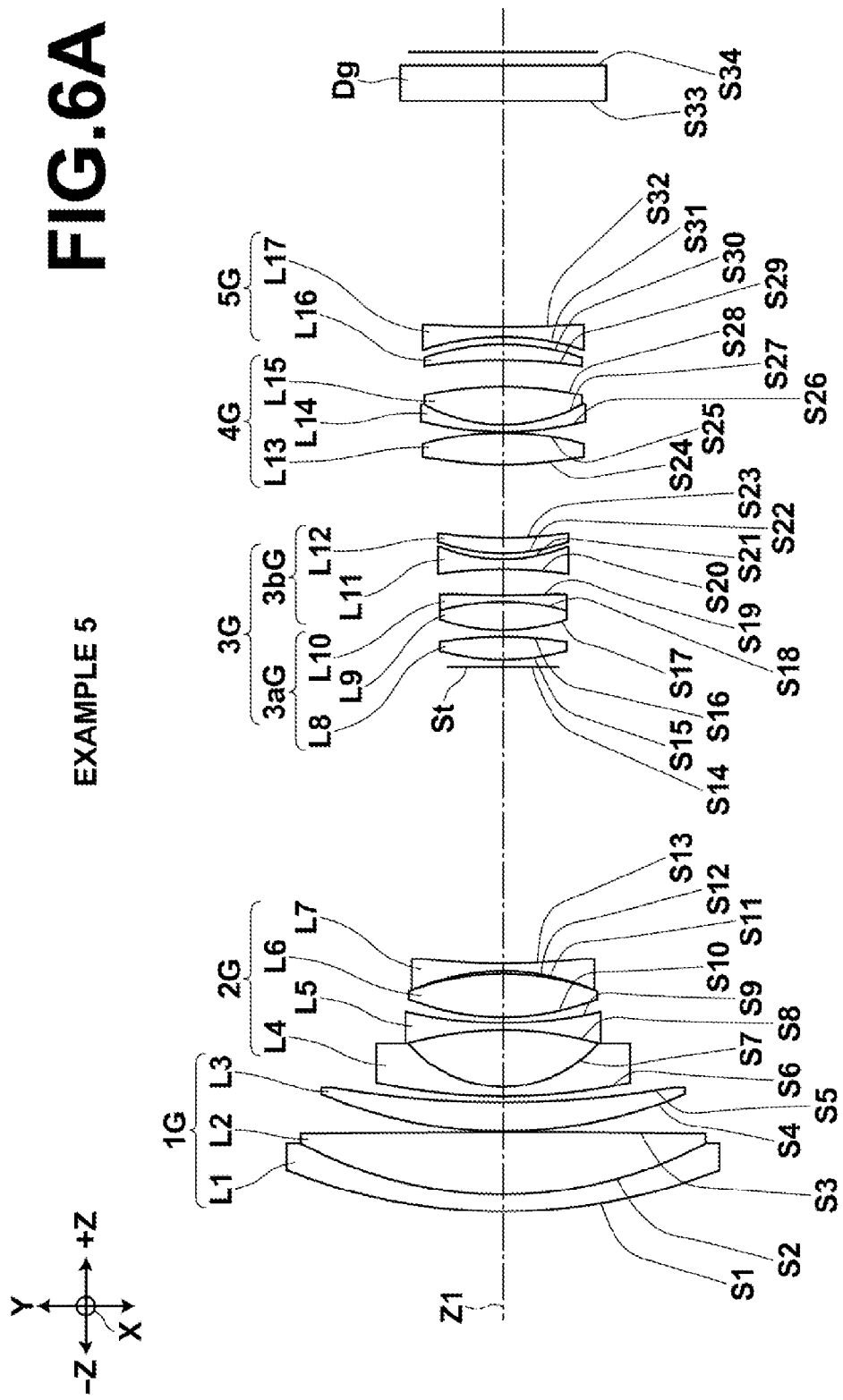

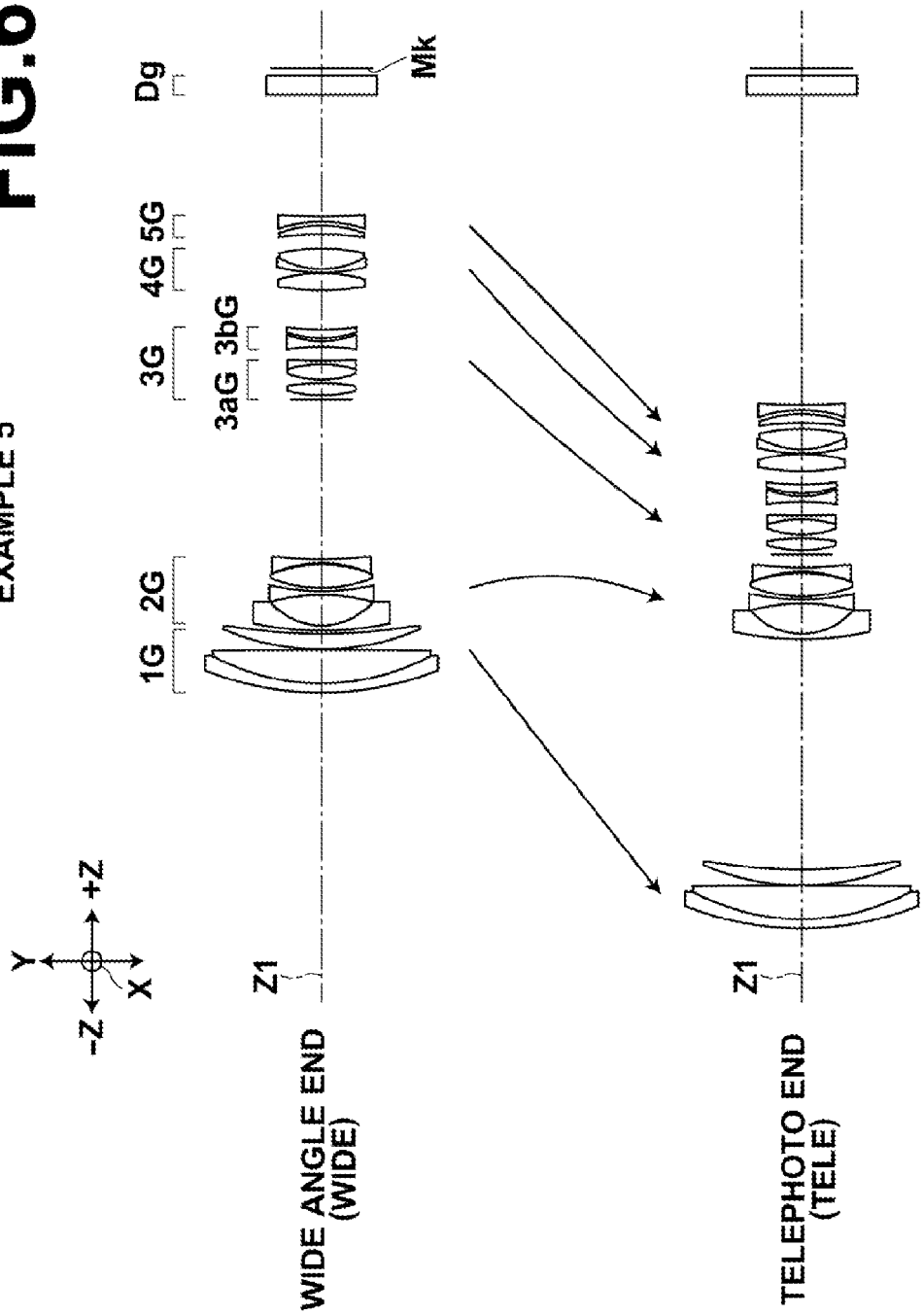

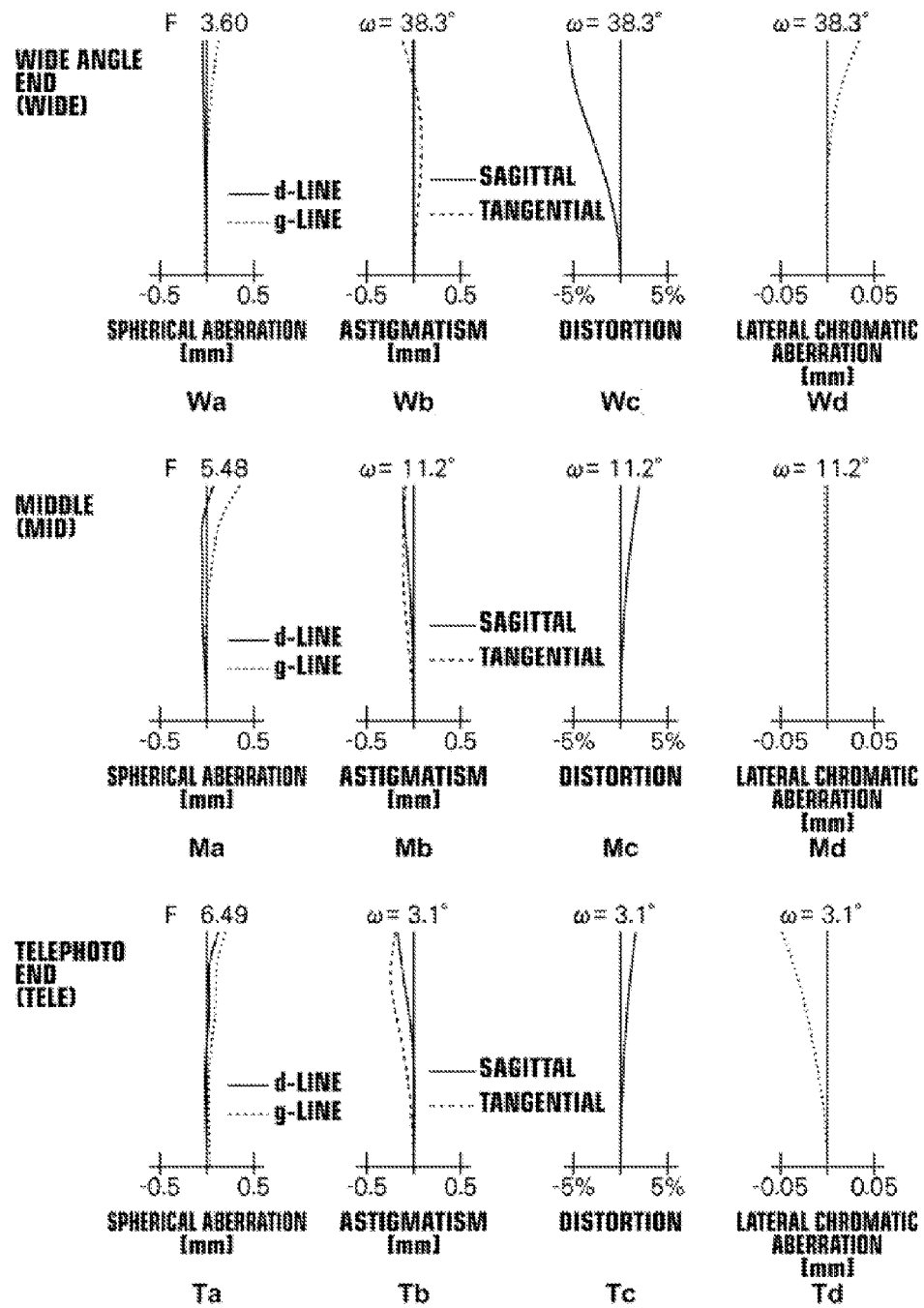

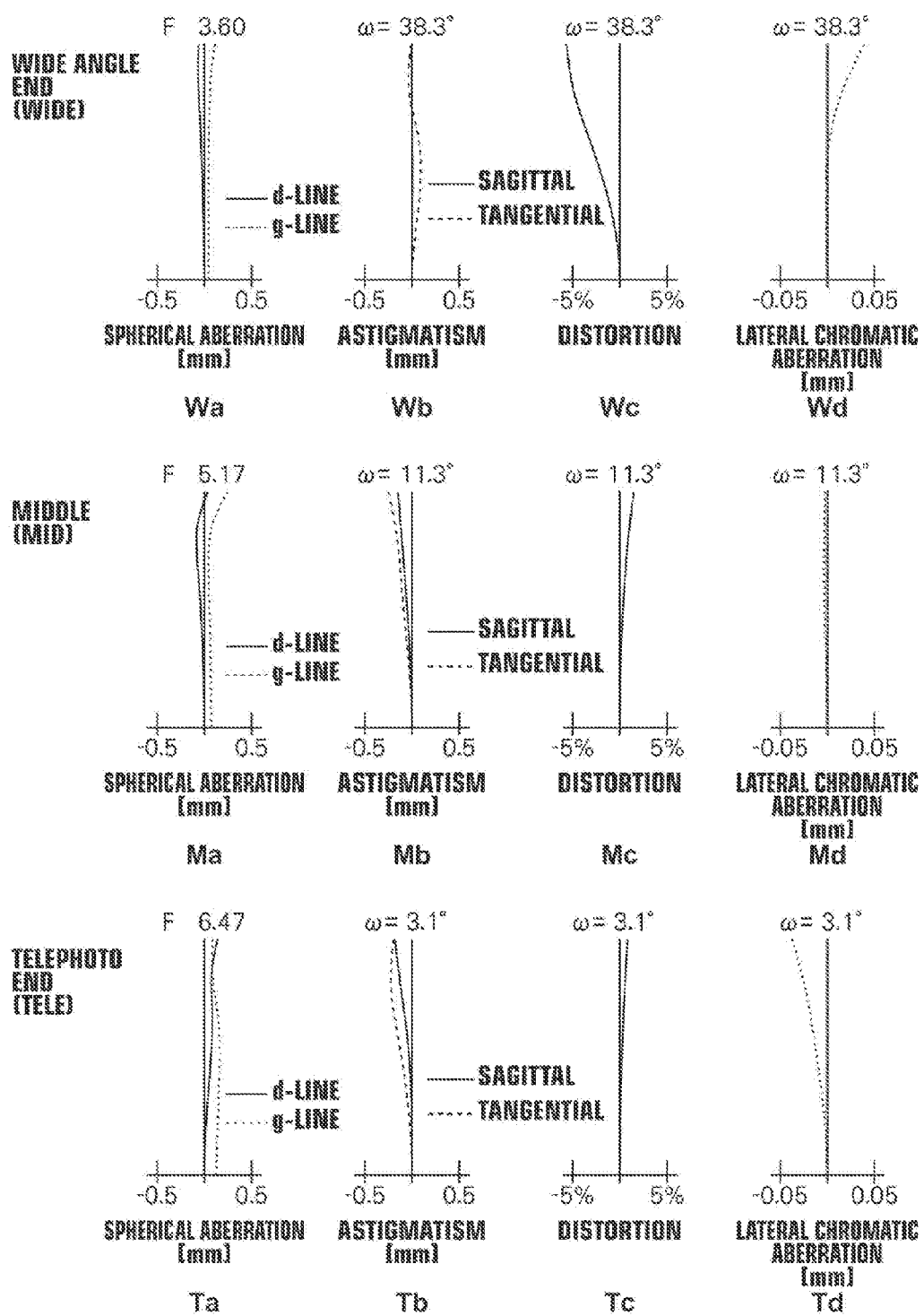

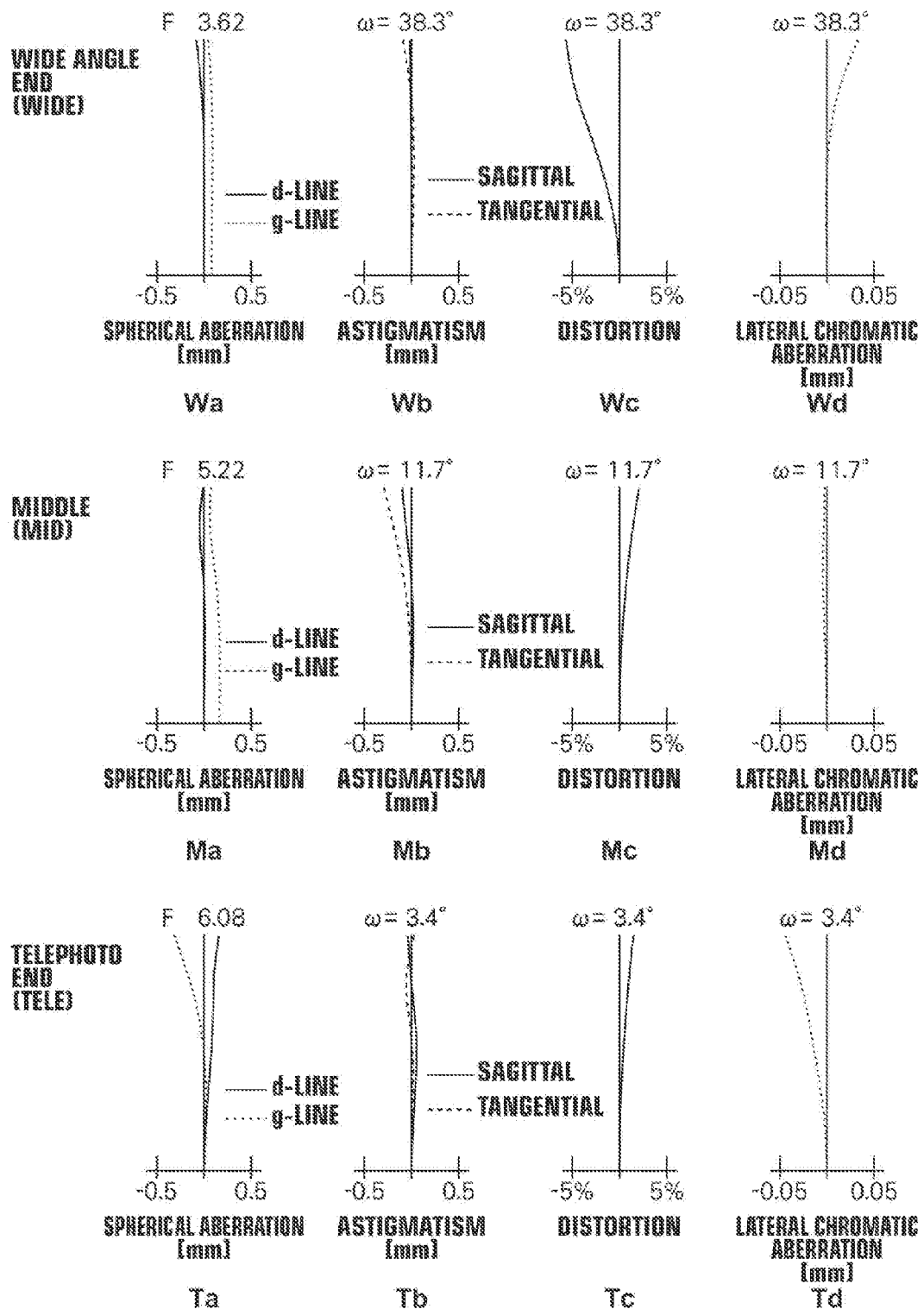
FIG.9 EXAMPLE 3

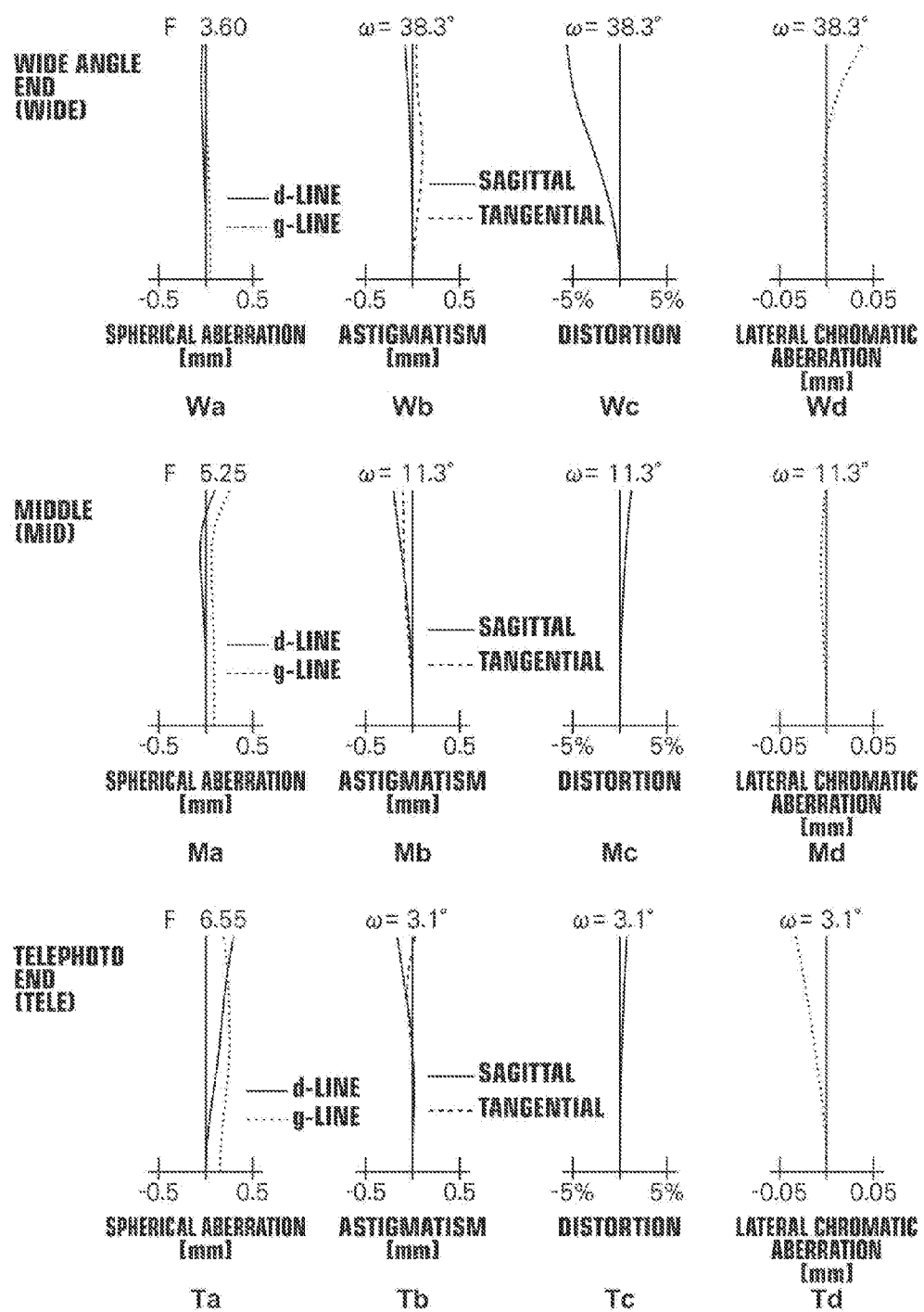

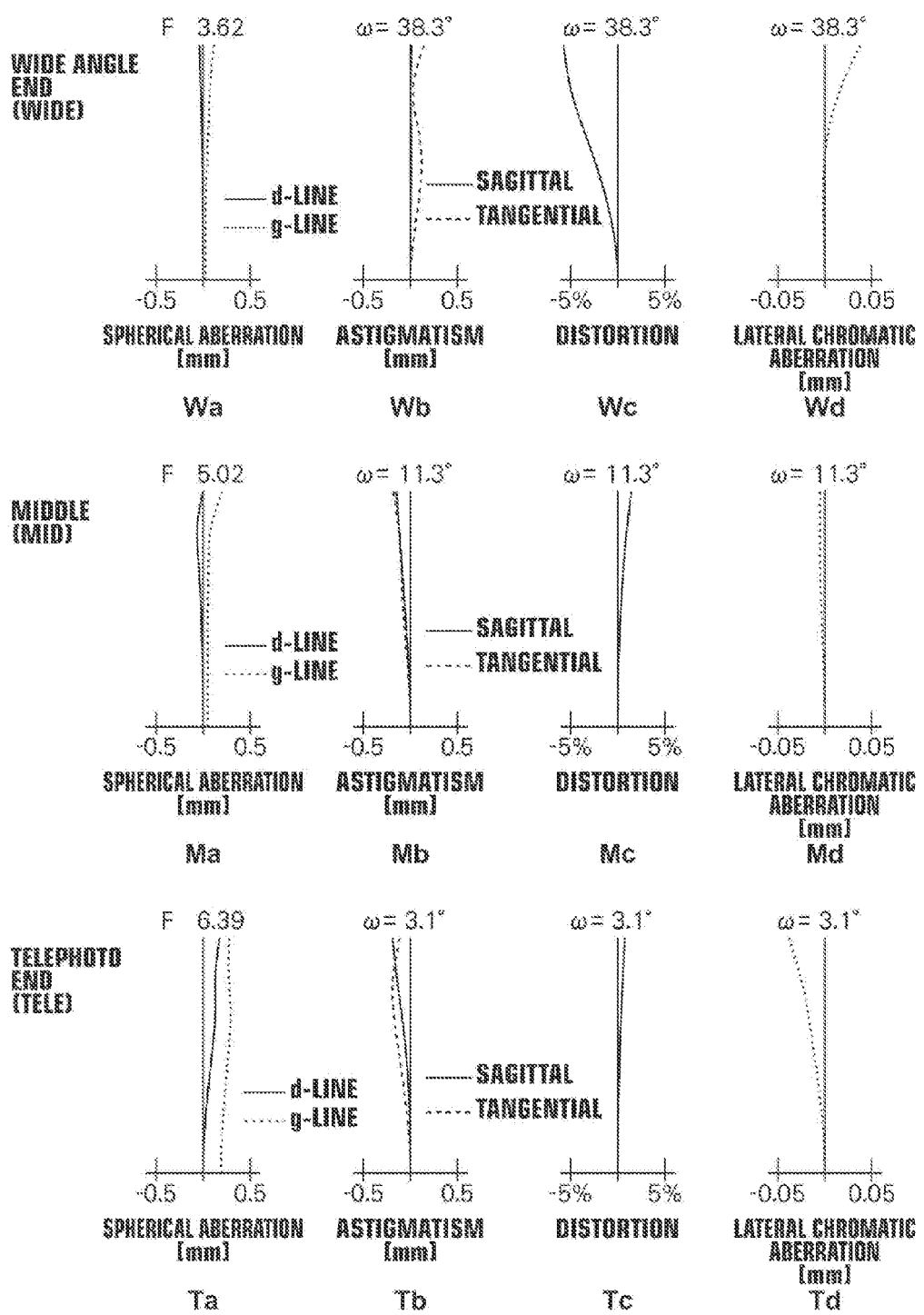

ZOOM LENS AND IMAGING APPARATUS

BACKGROUND OF THE INVENTION

1. Field of the Invention

The present invention relates to a zoom lens having a high variable magnification ratio used in electronic cameras such as digital cameras, video cameras, broadcasting cameras, surveillance cameras and the like, and to an imaging apparatus including the zoom lens.

2. Description of the Related Art

Conventionally, a zoom lens substantially consists of: a first lens group having positive refractive power; a second lens group having negative refractive power; a third lens group having positive refractive power; a fourth lens group having positive refractive power; and a fifth lens group having negative refractive power, which are arranged in this order from the object side, is known as a zoom lens having relatively a high variable magnification ratio. The zoom lens with such a lens construction is known to be appropriate for realizing both a high variable magnification ratio and a reduction in size (see Japanese Unexamined Patent Publication No. 4(1992)-070707, U.S. Pat. No. 5,872,659, and Japanese Unexamined Patent Publication No. 11(1999)-064728).

SUMMARY OF THE INVENTION

Recently, there is demand for a zoom lens, which is compact, and yet has a high variable magnification ratio, e.g., a zoom lens which has a high variable magnification ratio of over 12×, and yet which is compact and capable of high performance.

However, conventionally known compact and high performance zoom lenses, e.g., the zoom lenses disclosed in Japanese Unexamined Patent Publication No. 4(1992)-070707, U.S. Pat. No. 5,872,659, and Japanese Unexamined Patent Publication No. 11(1999)-064728, have variable magnification ratios of less than 10×, and cannot necessarily be said to have high variable magnification ratios.

The present invention has been developed in view of the foregoing circumstances. It is an object of the present invention to provide a zoom lens, which has a high variable magnification ratio, and yet which is compact and capable of high performance, and an imaging apparatus including the zoom lens.

A zoom lens of the present invention substantially consists of:

a first lens group having positive refractive power;
a second lens group having negative refractive power;
a third lens group having positive refractive power;
a fourth lens group having positive refractive power; and
a fifth lens group having negative refractive power, which are arranged in this order from an object side,
wherein when varying magnification from a wide angle end to a telephoto end, the distance between the first lens group and the second lens group is consistently increased, the distance between the second lens group and the third lens group is consistently decreased, the distance between the third lens group and the fourth lens group is consistently decreased, and the distance between the fourth lens group and the fifth lens group is changed, while all of the lens groups are moved with respect to an image formation position,
wherein when moving a point of focus from an infinity side to a near side to achieve focus, only the fifth lens group is moved from the object side to the image side, and
wherein the fifth lens group has at least one lens having negative refractive power and at least one lens having positive refractive power.

The zoom lens can be substantially composed of five lens groups. In this case, the expression "zoom lens which is substantially composed of n lens groups" refers to a zoom lens that includes lenses substantially without any refractive power; optical elements other than lenses such as apertures and glass covers; and mechanical components such as lens flanges, lens barrels, imaging elements, and camera shake correction mechanisms; in addition to the n lens groups.

It is desirable for the fifth lens group to have at least one aspheric surface and to satisfy formula (A): $10<\nu_{5n}-\nu_{5p}<30$ and formula (B): $1.77<N_{5n}$ at the same time, and it is more desirable for the fifth lens group to satisfy formula (A'): $12<\nu_{5n}-\nu_{5p}<25$ and formula (B'): $1.79<N_{5n}$.

In this case, $\nu_{5n}$ is an average value of the Abbe number (based on the d-line) of each lens having negative refractive power, which constitute the fifth lens group; $\nu_{5p}$ is an average value of the Abbe number (based on the d-line) of each lens having positive refractive power, which constitute the fifth lens group; and $N_{5n}$ is an average value of the refractive index of each lens having negative refractive power, which constitute the fifth lens group.

It is desirable for the zoom lens to satisfy formula (C): $-0.6<1-\beta_{5T}^2<-2.5$, more desirable to satisfy formula (C'): $-5.5<1-\beta_{5T}^2<-2.9$. $\beta_{5T}$ is an image formation magnification of the fifth lens group when focusing on infinity at the telephoto end, and further desirable to satisfy formula (Ca): $-3.99 \leq 1-\beta_{5T}^2 \leq -3.30$.

The fifth lens group may have a lens having positive refractive power and a lens having negative refractive power arranged in this order from the object side.

An imaging apparatus of the present invention is equipped with the zoom lens of the present invention.

The zoom lens and the imaging apparatus including the zoom lens according to the present invention substantially consists of:

a first lens group having positive refractive power;
a second lens group having negative refractive power;
a third lens group having positive refractive power;
a fourth lens group having positive refractive power; and
a fifth lens group having negative refractive power, which are arranged in this order from the object side of the zoom lens,
wherein when varying magnification from a wide angle end to a telephoto end, a distance between the first lens group and the second lens group is consistently increased, a distance between the second lens group and the third lens group is consistently decreased, a distance between the third lens group and the fourth lens group is consistently decreased, and a distance between the fourth lens group and the fifth lens group is changed such that all of the lens groups moved with respect to an image formation position,
wherein when moving a point of focus from an infinity side to a near side to achieve focus, only the fifth lens group is moved from the object side to the image side, and
wherein the fifth lens group has at least one lens having negative refractive power and at least one lens having positive refractive power, thereby enabling the zoom lens to have a high variable magnification ratio, and yet to be compact and capable of high performance.

Thus, for example, a zoom lens which has a full angle of view at a wide angle end exceeding 75°, that is, a large angle of view, and which further has a high variable magnification ratio exceeding 12×, and yet is compact and capable of high performance can be obtained.

Further, the fifth lens group is designed to have at least one negative lens and at least one positive lens, and when focused from the infinity side toward the near side, only the fifth lens group is moved from the object side to the image side. This can suppress performance deterioration when focusing, and further enables a reduction in size and weight of the fifth lens group which is a moving group. This enables a reduction in the burden on a focus mechanism in the imaging apparatus including the zoom lens, and high-speed focus can be realized, for example.

BRIEF DESCRIPTION OF THE DRAWINGS

FIG. 1 is a schematic cross sectional diagram illustrating the structure of a zoom lens and an imaging apparatus including the zoom lens according to an embodiment of the present invention;

FIG. 2A is a cross sectional diagram illustrating a zoom lens of Reference Example 1;

FIG. 2B is a cross sectional diagram illustrating each of a case that a zoom setting of the zoom lens of Reference Example 1 is set to a wide angle end and a case that a zoom setting thereof is set to a telephoto end;

FIG. 3A is a cross sectional diagram illustrating a zoom lens of Example 2;

FIG. 3B is a cross sectional diagram illustrating each of a case that a zoom setting of the zoom lens of Example 2 is set to the wide angle end and a case that a zoom setting thereof is set to the telephoto end;

FIG. 4A is a cross sectional diagram illustrating a zoom lens of Example 3;

FIG. 4B is a cross sectional diagram illustrating each of a case that a zoom setting of the zoom lens of Example 3 is set to the wide angle end and a case that a zoom setting thereof is set to the telephoto end;

FIG. 5A is a cross sectional diagram illustrating a zoom lens of Example 4;

FIG. 5B is a cross sectional diagram illustrating each of a case that a zoom setting of the zoom lens of Example 4 is set to the wide angle end and a case that a zoom setting thereof is set to the telephoto end;

FIG. 6A is a cross sectional diagram illustrating a zoom lens of Example 5;

FIG. 6B is a cross sectional diagram illustrating each of a case that a zoom setting of the zoom lens of Example 5 is set to the wide angle end and a case that a zoom setting thereof is set to the telephoto end;

FIG. 7 is an aberration diagram of Reference Example 1;
FIG. 8 is an aberration diagram of Example 2;
FIG. 9 is an aberration diagram of Example 3;
FIG. 10 is an aberration diagram of Example 4; and
FIG. 11 is an aberration diagram of Example 5.

DESCRIPTION OF THE PREFERRED EMBODIMENTS

Hereinafter, the zoom lens ad the imaging apparatus including the lens of the present invention will be described with reference to the attached drawings.

FIG. 1 is a schematic cross sectional diagram illustrating the structure of a zoom lens and an imaging apparatus including the zoom lens according to an embodiment of the present invention.

The zoom lens 100 as shown in the Figure has a high variable magnification ratio, and yet is compact and capable of high performance. The imaging apparatus 200 equipped with the zoom lens 100 is used as a digital still camera, a video camera, a surveillance camera, or the like.

The zoom lens 100 is composed of a first lens group 1G having positive refractive power, a second lens group 2G having negative refractive power, a third lens group 3G having positive refractive power, a fourth lens group 4G having positive refractive power, and a fifth lens group 5G having negative refractive power, in this order from an object side (the side of −Z in the Figures).

The zoom lens 100 consistently increases a distance δ12 between the first lens group 1G and the second lens group 2G, consistently decreases a distance δ23 between the second lens group 2G and the third lens group 3G, consistently decreases a distance δ34 between the third lens group 3G and the fourth lens group 4G, and changes a distance δ45 between the fourth lens group 4G and the fifth lens group 5G, while all of the lens groups 1G through 5G are moved with respect to an image formation surface Mk which is an image formation position of the zoom lens 100, when zooming from the wide angle end to the telephoto end (continuously varying magnification).

Further, the above zoom lens 100 is designed to move only the fifth lens group 5G from the object side (the side of −Z in the Figures) to the image side (the side of +Z in the Figures) to achieve focus when moving a point of focus from an infinity side to a near side.

Moreover, the above fifth lens group 5G has at least one lens having negative refractive power (hereinafter, also abbreviated and referred to as negative lens) and at least one lens having positive refractive power (hereinafter, also abbreviated and referred to as positive lens).

The basic configuration of the zoom lens 100 is as described above.

It should be noted that the fifth lens group 5G has at least one aspheric surface, and that it is desirable for the fifth lens group 5G to satisfy formula (A): $10<v_{5n}-v_{5p}<30$ and formula (B): $1.77<N_{5n}$ at the same time, and it is more desirable for the fifth lens group to satisfy formula (A'): $12<v_{5n}-v_{5p}<25$ and formula (B'): $1.79<N_{5n}$ at the same time.

In this case, $v_{5n}$ is an average value of the Abbe number (based on the d-line) of each lens having negative refractive power, which constitute the fifth lens group; $v_{5p}$ is an average value of the Abbe number (based on the d-line) of each lens having positive refractive power, which constitute the fifth lens group; and $N_{5n}$ is an average value of the refractive index (the d-line) of each lens having negative refractive power, which constitute the fifth lens group.

As described above, if the fifth lens group has at least one aspheric surface, performance variations can be favorably suppressed at the time of focusing.

Formula (A) regulates the Abbe number with respect to the d-line of a negative lens and a positive lens that constitute the fifth lens group 5G. If the zoom lens is constructed in such a manner that the value of $v_{5n}-v_{5p}$ is lower than the lower limit defined by formula (A), correction for chromatic aberration within the fifth lens group 5G will be insufficient, and chromatic aberration will become a problem at the time of focal shift. Meanwhile, if the zoom lens is constructed in such a manner that the value of $v_{5n}-v_{5p}$ exceeds the upper limit defined by formula (A), correction for chromatic aberration within the fifth lens group 5G is sufficient, but the refractive index of the negative lens will be forced to be small. This will cause a problem that the curvature of image field of peripheral images will become large.

Formula (B) regulates the refractive index with respect to the d-line of a negative lens within the fifth lens group 5G. If the zoom lens 100 is constructed in such a manner that the value of $N_{5n}$ is lower than the lower limit defined by formula (B), a refractive index of a negative lens within the fifth lens group 5G becomes too small, which will cause a problem that the curvature of image field of peripheral images will become more likely to occur.

Further, it is desirable for the zoom lens 100 to satisfy formula (C): $-0.6 < 1 - \beta_{5T}^2 < -2.5$, and more desirably, formula (C'): $-5.5 < 1 - \beta_{5T}^2 < -2.9$.

$\beta_{5T}$ is an image formation magnification of the fifth lens group when focusing on infinity at the telephoto end.

Formula (C) regulates the sensitivity to image shift with respect to a focal shift at the time of focusing on infinity at the telephoto end in the fifth lens group 5G. If the zoom lens 100 is constructed in such a manner that the value of $1-\beta_{5T}^2$ is lower than the lower limit defined by formula (C), the sensitivity to the image shift with respect to the focal shift of the fifth lens group 5G at the telephoto end will be excessively increased, which will cause the amount of amplitude shift of the fifth lens group 5G for finding the best point of focus to be excessively reduced. As a result, problems such that it will become difficult to perform focus control, for example, the focal shift of the fifth lens group 5G becoming suspended, will arise. If the zoom lens 100 is constructed in such a manner that the value of $1-\beta_{5T}^2$ exceeds the upper limit defined by formula (C), the sensitivity of the image shift with respect to the focal shift of the fifth lens group 5G will be acceptable at the telephoto end, but the sensitivity at the wide angle end will be excessively reduced. This will cause the amount of amplitude shift of the fifth lens group 5G for finding the best point of focus to be excessively increased. As a result, for example, problems, that abnormal noises are made by the focusing mechanism at the time of the focus shift, will arise.

The fifth lens group 5G is constructed of a positive lens and a negative lens, and it is desirable to arrange the positive lens and the negative lens in this order from the object side. This enables the fifth lens group 5G to be constituted by the requisite minimum number of lenses which can suppress performance variations at the time of focusing, thereby reducing the burden on the focusing mechanism and achieving high-speed focus. Further, the arrangement of the positive lens and the negative lens in this order from the object side facilitates divergence of reflection on each lens surface for a light beam which is reflected on the imaging surface of the imaging element and which returns to the fifth lens group 5G because more convex surfaces of the lenses constituting the fifth lens group 5G face toward the image side. This reduces the generation of eye-catching ghost images.

The imaging apparatus 200 illustrated in FIG. 1 includes the zoom lens 100, and an imaging element 210 constituted of a CCD which images an optical image Hk (an optical image representing a subject H) formed through the zoom lens 100, a CMOS, or the like. An imaging surface 211 of the imaging element 210 is an image formation position (an image formation surface Mk) of the imaging lens 100.

In this case, an optical member Dg is disposed between the most-image-side lens (as indicated by the item Se in the zoom lens 100 of FIG. 1) and the imaging surface 211.

Various optical members may be employed as the optical member Dg depending on the configuration of the imaging apparatus 200 with which the imaging lens 100 is equipped. For example, a single or a plurality of a member or members that correspond(s) to an imaging surface protection cover glass, an infrared cut filter, an ND filter, and the like may be provided.

Hereinafter, Reference Example 1 of the zoom lens and Examples through 5 of the zoom lens of the present invention will be specifically described with reference to FIGS. 2A, 2B . . . 6A, 6B, 7 . . . 11 and the like.

Each zoom lens of Reference Example 1 and Examples 2 through 5 satisfies the configuration of the zoom lens 100 and includes the following constituent elements. In this case, each zoom lens of Examples 2 through 5 satisfies formula (Ca): $-3.99 \leq 1-\beta_{5T}^2 \leq -3.30$, but the zoom lens of Reference Example 1 fails to satisfy formula (Ca): $-3.99 \leq 1-\beta_{5T}^2 \leq -3.30$.

Each zoom lens of Reference Example 1 and Examples 2 through 5 is constituted by a first lens group 1G consisting of three lenses, a second lens group 2G consisting of four lenses, a third lens group 3G consisting of five lenses, a fourth lens group 4G consisting of three lenses, and a fifth lens group 5G consisting of two lenses.

In the first lens group 1G, a first group-first lens L1, a first group-second lens L2, and a first group-third lens L3 are arranged in this order from the object side.

Further, in the second lens group 2G, a second lens group-first lens L4, a second lens group-second lens L5, a second lens group-third lens L6, and a second lens group-fourth lens L7 are arranged in this order from the object side.

Further, in the third lens group 3G, a third lens group-first lens L8, a third lens group-second lens L9, a third lens group-third lens L10, a third lens group-fourth lens L11, and a third lens group-fifth lens L12 are arranged in this order from the object side.

In the fourth lens group 4G, a fourth lens group-first lens L13, a fourth lens group-second lens L14, and a fourth lens group-third lens L15 are arranged in this order from the object side.

Further, in the fifth lens group 5G, a fifth group-first lens L16, and a fifth group-second lens L17 are arranged in this order from the object side.

The third lens group 3G consisting of five lenses as described above, is constructed to have three lenses (a third-a lens group 3aG having positive refractive power) arranged closest to the object side and two lenses arranged closest to the image side (a third-b lens group 3bG). The third-b lens group 3bG is constructed to be movable in a direction perpendicular to an optical axis (a direction in which an X-Y plane extends), which enables a camera shake correction function to work.

In this case, the third-a lens group 3aG consists of the third group-first lens L8, the third group-second lens L9, and the third group-third lens L10, and the third-b lens group 3bG consists of the third group-fourth lens L11 and the third group-fifth lens L12.

An aperture stop St is disposed between the second lens group 2G and the third lens group 3G and is designed to be moved in an optical axis direction Z1 integrally with the third lens group 3G at the time of varying magnification.

Reference Example 1

FIGS. 2A and 2B illustrate a zoom lens of Reference Example 1. FIG. 2A is a detailed diagram illustrating the configuration of the zoom lens of Reference Example 1. FIG. 2B illustrates a state in which the zoom setting of the zoom lens of Reference Example 1 is set to the wide angle end (as indicated by "WIDE" in the Figure) at the upper part and a state in which the zoom setting thereof is set to the telephoto end (as indicated by "TELE" in the Figure) at the bottom part. Further, arrows indicate the paths of movement of the lens groups, respectively when magnification is changed from the wide angle end to the telephoto end.

In the fifth lens group 5G of the zoom lens of Reference Example 1, two lenses, i.e., a negative lens and a positive lens, are arranged in this order from the object side.

Further, Table 1A to be described later shows various data related to the zoom lens of Reference Example 1. The upper part of Table 1A shows lens data, the middle part shows schematic specifications of the zoom lens, and the bottom part shows the focal length of each lens group.

In the lens data at the upper part of Table 1A, a surface number i represents the i-th (i=1, 2, 3, . . . ) lens surface or the like, and the number sequentially increases from the most-object side toward the image side. The aperture stop St and the optical member Dg are also listed in these lens data.

Radius Ri of curvature represents the radius of curvature of the i-th surface (i=1, 2, 3, . . . ). Distance Di between surfaces (i=1, 2, 3, . . . ) represents a distance between the i-th surface and an (i+1)th surface on the optical axis Z1. The item Ri and the item Di in the lens data correspond to the item Si (i=1, 2, 3, . . . ) representing a lens surface or the like.

In the column of distance Di between surfaces (i=1, 2, 3, . . . ), there are a case in which numeral values representing a distance between surfaces are listed and a case in which the item Dm (m is an integral number). Numbers in the item Dm correspond to distances between surfaces (spatial distances), between the lens groups, and the distance between surfaces (spatial distance) varies depending on variable magnification ratios (zoom magnification).

Further, the item Nj represents the refractive index of a j-th (j=1, 2, 3, . . . ) optical element with respect to wavelength of 587.6 nm (the d-line), and numbers sequentially increase from the object side toward the image side. The item vj represents the Abbe number of the j-th optical element based on the d-line.

In the lens data of Table 1A, the unit of the radius of curvature and the distances between surfaces is mm. The radius of curvature is positive when a convex surface faces the object side and is negative when a convex surface faces the image side.

The optical system as described above is generally capable of maintaining a predetermined performance level in any of cases where the size of optical elements such as a lens or the like is proportionately increased or decreased, and therefore zoom lenses in which the numbers of the entire lens data related to the above Examples 2 through 5 are proportionately increased or decreased can be Examples related to the present invention as well.

The middle part of Table 1A represents each value of a wide angle end (WIDE), the middle of varying magnification (MID), and a telephoto end (TELE), i.e., distances between lens groups: D5, D13, D23, D28 and D32; f: the focal length of the entire lens system (unit mm of each value); Fno: F number; and 2ω: whole angles of view (in "°" units). The middle of varying magnification (MID) can be said to be a middle focal length position.

Further, the bottom part of Table 1A represents the focal length of each group. In this case, $F_1$: the focal length of the first lens group 1G, $F_2$: the focal length of the second lens group 2G, $F_3$: the focal length of the third lens group 3G, $F_4$: the focal length of the fourth lens group 4G, $F_5$: the focal length of the fifth lens group 5G, $F_{3a}$: the focal length of the third-a lens group 3aG, and $F_{3b}$: the focal length of the third-b lens group 3bG.

The term "the third-b group (OIS)" (OIS: Optical Image Stabilization) described in Table 1A represents being capable of achieving the performance of the camera shake correction function by allowing the third-b lens group 3bG to move in a direction perpendicular to the optical axis (in a direction to which X-Y plane extends).

TABLE 1A

REFERENCE EXAMPLE 1

| SURFACE NUMBER | Ri | Di | Nj | vj | GROUP STRUCTURE |
|---|---|---|---|---|---|
| 1 | 85.7554 | 1.950 | 1.84661 | 23.9 | FIRST GROUP |
| 2 | 62.5697 | 9.119 | 1.49700 | 81.5 | |
| 3 | −31126.9375 | 0.100 | | | |
| 4 | 77.2118 | 4.299 | 1.61800 | 63.3 | |
| 5 | 186.7731 | D5 | | | |
| 6 | 108.0235 | 1.350 | 1.88300 | 40.8 | SECOND GROUP |
| 7 | 18.6071 | 8.337 | | | |
| 8 | −55.8960 | 1.000 | 1.88300 | 40.8 | |
| 9 | 66.9403 | 0.700 | | | |
| 10 | 37.4987 | 6.589 | 1.84661 | 23.9 | |
| 11 | −38.9747 | 0.362 | | | |
| 12 | −34.0881 | 1.000 | 1.75500 | 52.3 | |
| 13 | 105.4506 | D13 | | | |
| (APERTURE STOP) 14 | ∞ | 1.000 | | | THIRD-a GROUP |
| 15 | 33.7005 | 3.568 | 1.56732 | 42.8 | |
| 16 | −52.6106 | 0.363 | | | |
| 17 | 28.4699 | 4.073 | 1.49700 | 81.5 | |
| 18 | −32.0211 | 0.900 | 1.90366 | 31.3 | |
| 19 | 211.4451 | 2.505 | | | |
| *20 | −67.2274 | 1.500 | 1.80348 | 40.4 | THIRD-b GROUP (OIS) |
| 21 | 24.5327 | 1.041 | | | |
| 22 | 27.2898 | 2.358 | 1.84661 | 23.9 | |
| 23 | 69.3194 | D23 | | | |
| *24 | 49.0350 | 4.377 | 1.51560 | 63.1 | FOURTH GROUP |
| *25 | −43.0727 | 0.169 | | | |
| 26 | 46.1728 | 1.000 | 1.84661 | 23.9 | |
| 27 | 22.9572 | 6.496 | 1.51680 | 64.2 | |
| 28 | −48.8859 | D28 | | | |
| *29 | 85.0541 | 1.500 | 1.80348 | 40.4 | FIFTH GROUP |
| *30 | 20.5630 | 0.099 | | | |
| 31 | 19.5078 | 2.277 | 1.92286 | 20.9 | |
| 32 | 25.9096 | D32 | | | |
| 33 | ∞ | 3.700 | 1.51680 | 64.2 | Dg |
| 34 | ∞ | | | | |

| | WIDE | MID | TELE |
|---|---|---|---|
| D5 | 0.950 | 32.298 | 66.596 |
| D13 | 42.834 | 15.932 | 3.617 |
| D23 | 12.578 | 6.213 | 3.622 |
| D28 | 2.153 | 3.937 | 1.901 |
| D32 | 35.505 | 66.444 | 82.661 |
| f | 18.384 | 67.549 | 248.190 |
| Fno | 3.60 | 5.48 | 6.49 |
| 2ω[°] | 76.61 | 22.49 | 6.22 |
| $f_1$ | 111.303 | | |
| $f_2$ | −17.195 | | |
| $f_3$ | 89.768 | | |
| $f_4$ | 28.523 | | |
| $f_5$ | −59.029 | | |
| $f_{3a}$ | 33.607 | | |
| $f_{3b}$ (OIS) | −39.462 | | |

Table 1B shows aspheric coefficients of aspheric surfaces of the zoom lens of Reference Example 1. In the lens data of Table 1A, the mark "*" attached to a surface number indicates that a surface represented by the surface number is an aspheric surface. Further, Table 1B shows the aspheric coefficients of aspheric surfaces corresponding to these surface numbers.

The aspheric coefficients represented in Table 1B are prepared to define aspheric shapes by being applied in the following aspheric equation.

$$Z = C \cdot h^2 / \{1 + (1 - K \cdot C^2 \cdot h^2)^{1/2}\} + \Sigma An \cdot h^n \quad \text{[Aspheric Equation 1]}$$

where

Z: the depth of an aspheric surface (mm)

h: the distance from the optical axis to a lens surface (height) (mm)

K: aspheric coefficients representing quadric surface
C: paraxial curvature=1/R (R: paraxial curvature radius)
An: n-dimensional (n is an integer not less than three) aspheric coefficient

TABLE 1B

ASPHERIC COEFFICIENT

| SIGN | *20 | *24 | *25 | *29 | *30 |
|---|---|---|---|---|---|
| | | | SURFACE NUMBER | | |
| K | 1.000000E+00 | 1.000000E+00 | 1.000000E+00 | 1.000000E+00 | 1.000000E+00 |
| A3 | −6.660863E−06 | 2.113073E−05 | 1.195308E−05 | 6.668667E−07 | 1.051388E−05 |
| A4 | 1.068409E−05 | −1.787018E−05 | 9.213718E−07 | −1.182857E−07 | −3.423284E−06 |
| A5 | −6.114474E−07 | −3.133994E−07 | 2.202715E−08 | −9.254225E−09 | 7.184053E−07 |
| A6 | 3.008719E−08 | 1.883512E−07 | −6.561077E−10 | −4.950193E−10 | −1.065630E−08 |
| A7 | 2.785752E−09 | −2.494012E−08 | −1.302087E−10 | −1.901654E−11 | −4.565539E−09 |
| A8 | −7.187710E−11 | 1.247161E−09 | −1.087276E−11 | −1.551834E−13 | −1.629647E−11 |
| A9 | −1.749371E−11 | 9.724427E−14 | −6.432469E−13 | 7.118640E−14 | 4.500121E−11 |
| A10 | 5.214071E−13 | −1.350450E−12 | −2.148723E−14 | 1.063682E−14 | −1.679259E−12 |
| A11 | −9.928876E−17 | 9.672666E−16 | −1.039705E−15 | 1.136476E−15 | 1.043516E−15 |
| A12 | −1.891767E−16 | 1.223378E−17 | −3.166091E−17 | 1.069028E−16 | 7.735059E−17 |
| A13 | −6.521684E−17 | −4.164422E−18 | 1.294460E−18 | 9.376248E−18 | 6.733229E−18 |
| A14 | −1.390141E−17 | −7.285136E−19 | 3.747765E−19 | 7.834346E−19 | 6.654046E−19 |
| A15 | −1.714540E−18 | 7.231878E−20 | 8.216610E−20 | 2.319643E−19 | 2.466336E−19 |
| A16 | −2.682522E−19 | 4.235680E−21 | 9.394894E−21 | 1.747560E−20 | 2.657868E−20 |

FIG. 7 is a diagram showing spherical aberration, astigmatism, distortion, and lateral chromatic aberration at each of a wide angle end (WIDE), the middle of varying magnification (MID), and a telephoto end (TELE) of the zoom lens of Reference Example 1. Further, aberrations of each light beam of the d-line and the g-line are shown in the Figure. The diagram of astigmatism represents aberrations with respect to sagittal image surfaces and tangential image surfaces.

As shown in FIG. 7, diagrams indicated by the symbols Wa, Ma, and Ta represent spherical aberration, diagrams indicated by the symbols Wb, Mb, and Tb represent astigmatism, diagrams indicated by the symbols Wc, Mc, and Tc represent distortion, and diagrams indicated by the symbols Wd, Md, and Td represent lateral chromatic aberration.

Table 6 as shown at the end of the description represents values (values evaluated from mathematical expressions of formulas (A), (B), and (C), individually) of formulas (A), (B), and (C) for Reference Example 1 and Examples 2 through 5, individually. The mathematical expression of each formula can be evaluated from various data and the like with respect to the zoom lenses in Tables 1A through 5A.

FIGS. 2A and 2B illustrating a configuration of the zoom lens of Reference Example 1, FIG. 7 illustrating aberrations of the zoom lens, Tables 1A & 1B representing the lens data and the like of the zoom lens, and Table 6 representing the values of each mathematical expression of formulas (A), (B), and (C) are read in the same manner as in Examples 2 through 5 to be described later, and therefore detailed descriptions thereof will be omitted.

Example 2

FIGS. 3A and 3B show a zoom lens of Example 2. FIG. 3A is a diagram illustrating the specific configuration of the zoom lens of Example 2. FIG. 3B is related to the zoom lens of Example 2, and illustrates a state in which the zoom setting is set to a wide angle end (as indicated by "WIDE" in the Figure) at the upper part and a state in which the zoom setting thereof is set to a telephoto end (as indicated by "TELE" in the Figure) at the bottom part. Further, arrows indicate the paths of movement of the lens groups, respectively when magnification is changed from the wide angle end to the telephoto end.

In the fifth lens group 5G of the zoom lens of Example 2, two lenses, i.e., a positive lens and a negative lens, are arranged in this order from the object side.

Further, Table 2A shows various data related to the zoom lens of Example 2. The upper part of Table 2A shows lens data, the middle part shows schematic specifications of the zoom lens, and the bottom part shows the focal length of each lens group.

TABLE 2A

EXAMPLE 2

| SURFACE NUMBER | Ri | Di | Nj | vj | GROUP STRUCTUER |
|---|---|---|---|---|---|
| 1 | 85.2292 | 2.520 | 1.84661 | 23.9 | FIRST GROUP |
| 2 | 61.7335 | 9.054 | 1.49700 | 81.5 | |
| 3 | −1963.5475 | 0.100 | | | |
| 4 | 66.8404 | 4.168 | 1.60300 | 65.4 | |
| 5 | 147.8987 | D5 | | | |
| 6 | 88.0438 | 1.400 | 1.88300 | 40.8 | SECOND GROUP |
| 7 | 18.3402 | 8.245 | | | |
| 8 | −50.9539 | 1.050 | 1.83481 | 42.7 | |
| 9 | 63.5833 | 1.045 | | | |
| 10 | 37.5330 | 6.423 | 1.84661 | 23.9 | |
| 11 | −37.5330 | 0.405 | | | |
| 12 | −32.6020 | 1.050 | 1.77250 | 49.6 | |
| 13 | 97.2521 | D13 | | | |
| (APERTURE STOP) 14 | ∞ | 1.000 | | | THIRD-a GROUP |
| 15 | 33.0761 | 3.238 | 1.54814 | 45.8 | |
| 16 | −58.1129 | 0.218 | | | |
| 17 | 29.9896 | 4.828 | 1.49700 | 81.5 | |
| 18 | −29.9896 | 0.900 | 1.85026 | 32.3 | |
| 19 | 200.1256 | 4.148 | | | |
| *20 | −64.3421 | 1.500 | 1.80168 | 40.7 | THIRD-b GROUP (OIS) |
| *21 | 24.7941 | 0.835 | | | |
| 22 | 27.9314 | 2.293 | 1.84661 | 23.9 | |
| 23 | 67.4658 | D23 | | | |
| *24 | 52.0924 | 4.603 | 1.51530 | 62.8 | FOURTH GROUP |
| *25 | −41.7940 | 0.118 | | | |
| 26 | 48.9063 | 1.050 | 1.75520 | 27.5 | |
| 27 | 23.5612 | 5.631 | 1.48749 | 70.2 | |
| 28 | −52.7318 | D28 | | | |
| 29 | −77.6900 | 2.362 | 1.80518 | 25.4 | FIFTH GROUP |
| 30 | −34.1433 | 1.323 | | | |
| *31 | −38.3946 | 1.500 | 1.80168 | 40.7 | |

TABLE 2A-continued

EXAMPLE 2

| *32 | 175.1091 | D32 | | | |
|---|---|---|---|---|---|
| 33 | ∞ | 5.200 | 1.51680 | 64.2 | Dg |
| 34 | ∞ | | | | |

| | WIDE | MID | TELE |
|---|---|---|---|
| D5 | 0.900 | 34.251 | 61.985 |
| D13 | 43.622 | 17.798 | 3.965 |
| D23 | 10.401 | 5.906 | 3.496 |
| D28 | 3.770 | 5.315 | 1.700 |
| D32 | 33.109 | 60.979 | 85.617 |
| f | 18.388 | 67.562 | 248.238 |
| Fno | 3.60 | 5.18 | 6.47 |
| 2ω[°] | 76.59 | 22.60 | 6.27 |
| $f_1$ | 105.536 | | |
| $f_2$ | −16.856 | | |
| $f_3$ | 97.458 | | |
| $f_4$ | 29.520 | | |
| $f_5$ | −84.482 | | |
| $f_{3a}$ | 35.192 | | |
| $f_{3b}$ (OIS) | −37.423 | | |

Table 2B shows aspheric coefficients of aspheric surfaces of the zoom lens of Example 2.

TABLE 2B

ASPHERIC COEFFICIENT

SURFACE NUMBER

| SIGN | *20 | *21 | *24 | *25 | *31 | *32 |
|---|---|---|---|---|---|---|
| K | 1.000000E+00 | 1.000000E+00 | 1.000000E+00 | 1.000000E+00 | 1.000000E+00 | 1.000000E+00 |
| A3 | −6.214685E−06 | 1.210237E−06 | 2.670345E−05 | 1.418960E−05 | 6.078072E−06 | 7.219238E−07 |
| A4 | 1.178008E−05 | −2.059917E−07 | −1.699876E−05 | 3.117539E−07 | −8.397924E−08 | −1.310513E−07 |
| A5 | −5.734545E−07 | −7.148778E−09 | −2.869234E−07 | 2.819776E−09 | −3.195286E−07 | −3.857289E−09 |
| A6 | 2.988894E−08 | 1.380535E−10 | 1.883256E−07 | −7.772038E−10 | −4.462125E−09 | −5.848393E−10 |
| A7 | 2.617898E−09 | 2.608762E−11 | −2.502808E−08 | −9.142656E−11 | 2.561994E−09 | −7.783658E−11 |
| A8 | −9.134118E−11 | 1.435216E−13 | 1.237420E−09 | −6.908198E−12 | 7.007254E−11 | −7.925124E−12 |
| A9 | −1.920589E−11 | −3.192440E−13 | −6.986446E−13 | −4.003267E−13 | −2.680817E−11 | −7.016044E−13 |
| A10 | 3.923019E−13 | −5.843137E−14 | −1.406596E−12 | −1.483360E−14 | 9.907504E−13 | −5.825802E−14 |
| A11 | −7.929852E−15 | −7.084585E−15 | −2.653633E−15 | −1.835598E−15 | −9.622458E−15 | −4.777413E−15 |
| A12 | −6.308512E−16 | −6.646965E−16 | −2.176749E−16 | −2.125550E−16 | −9.379487E−16 | −4.039401E−16 |
| A13 | −5.271484E−17 | −4.473916E−17 | −2.116950E−17 | −2.258551E−17 | −8.488742E−17 | −3.628087E−17 |
| A14 | −2.605892E−18 | −6.306065E−19 | −2.497013E−18 | −2.231667E−18 | −7.080190E−18 | −3.496352E−18 |
| A15 | 1.622770E−18 | 4.767090E−19 | −2.199383E−19 | −3.898770E−19 | −6.276121E−19 | −8.095367E−19 |
| A16 | 3.760341E−19 | 1.155446E−19 | −2.569275E−20 | −4.124631E−20 | −3.345415E−20 | −9.331008E−20 |

FIG. 8 is a diagram showing spherical aberration, astigmatism, distortion, and lateral chromatic aberration at each of a wide angle end (WIDE), the middle of varying magnification (MID), and a telephoto end (TELE) of the zoom lens of Example 2.

The zoom lens of Example 2, which is constructed in such a manner, can have a high variable magnification ratio, and yet be compact and capable of high performance.

Example 3

FIGS. 4A and 4B show a zoom lens of Example 3. FIG. 4A is a diagram illustrating the specific configuration of the zoom lens of Example 3. FIG. 4B is related to the zoom lens of Example 3, and illustrates a state in which the zoom setting is set to a wide angle end (as indicated by "WIDE" in the Figure) at the upper part and a state in which the zoom setting thereof is set to a telephoto end (as indicated by "TELE" in the Figure) at the bottom part. Further, arrows indicate the paths of movement of the lens groups, respectively when magnification is changed from the wide angle end to the telephoto end.

In the fifth lens group 5G of the zoom lens of Example 3, two lenses, i.e., a positive lens and a negative lens, are arranged in this order from the object side.

Further, Table 3A shows various data related to the zoom lens of Example 3. The upper part of Table 2A shows lens data, the middle part shows schematic specifications of the zoom lens, and the bottom part shows the focal length of each lens group.

TABLE 3A

EXAMPLE 3

| SURFACE NUMBER | Ri | Di | Nj | vj | GROUP STRUCTURE |
|---|---|---|---|---|---|
| 1 | 86.1227 | 1.650 | 1.84661 | 23.9 | FIRST GROUP |
| 2 | 62.0701 | 9.553 | 1.49700 | 81.5 | |
| 3 | −4250.8858 | 0.200 | | | |
| 4 | 69.0201 | 5.134 | 1.61800 | 63.3 | |
| 5 | 173.7706 | D5 | | | |
| 6 | 143.9195 | 1.250 | 1.88300 | 40.8 | SECOND GROUP |
| 7 | 17.9097 | 8.359 | | | |
| *8 | −54.1875 | 0.200 | 1.52771 | 41.8 | |
| 9 | −52.5929 | 1.000 | 1.80400 | 46.6 | |

TABLE 3A-continued

EXAMPLE 3

| 10 | 61.2864 | 1.229 | | | |
|---|---|---|---|---|---|
| 11 | 38.6886 | 5.875 | 1.84661 | 23.9 | |
| 12 | −38.4723 | 1.010 | 1.80400 | 46.6 | |
| 13 | 99.9343 | D13 | | | |
| (APERTURE STOP) 14 | ∞ | 1.000 | | | THIRD-a GROUP |
| 15 | 32.7747 | 3.500 | 1.54814 | 45.8 | |
| 16 | −52.1190 | 1.172 | | | |
| 17 | 28.6007 | 4.608 | 1.49700 | 81.5 | |
| 18 | −31.7142 | 1.000 | 1.90366 | 31.3 | |
| 19 | 247.9630 | 2.532 | | | |
| *20 | −62.9067 | 1.500 | 1.80348 | 40.4 | THIRD-b GROUP (OIS) |
| 21 | 24.4096 | 1.000 | | | |
| 22 | 26.9299 | 2.518 | 1.84661 | 23.9 | |
| 23 | 65.6490 | D23 | | | |
| *24 | 49.2954 | 4.978 | 1.51560 | 63.1 | FOURTH GROUP |
| *25 | −44.8007 | 1.459 | | | |
| 26 | 47.4064 | 0.900 | 1.84661 | 23.9 | |
| 27 | 23.0755 | 6.115 | 1.51680 | 64.2 | |
| 28 | −45.9160 | D28 | | | |
| 29 | −225.5534 | 2.848 | 1.84661 | 23.9 | FIFTH |

TABLE 3A-continued

EXAMPLE 3

| | | | | | |
|---|---|---|---|---|---|
| 30 | −35.6067 | 0.500 | | | GROUP |
| *31 | −39.1114 | 1.500 | 1.80348 | 40.4 | |
| *32 | 54.4009 | D32 | | | |
| 33 | ∞ | 3.700 | 1.51680 | 64.2 | Dg |
| 34 | ∞ | | | | |

| | WIDE | MID | TELE |
|---|---|---|---|
| D5 | 0.999 | 31.879 | 61.061 |
| D13 | 42.746 | 17.373 | 4.203 |
| D23 | 11.516 | 5.965 | 3.499 |
| D28 | 1.951 | 3.394 | 1.885 |
| D32 | 35.490 | 64.031 | 78.012 |
| f | 18.382 | 64.988 | 229.769 |
| Fno | 3.62 | 5.22 | 6.08 |
| 2ω[°] | 76.61 | 23.33 | 6.73 |
| $f_1$ | 103.033 | | |
| $f_2$ | −16.513 | | |
| $f_3$ | 87.566 | | |
| $f_4$ | 29.127 | | |
| $f_5$ | −66.647 | | |
| $f_{3a}$ | 33.407 | | |
| $f_{3b}$ (OIS) | −37.492 | | |

Table 3B shows aspheric coefficients of aspheric surfaces of the zoom lens of Example 3.

TABLE 3B

ASPHERIC COEFFICIENT

SURFACE NUMBER

| SIGN | *8 | *20 | *24 | *25 | *31 | *32 |
|---|---|---|---|---|---|---|
| K | 1.464546E+00 | 1.000000E+00 | 1.000000E+00 | 1.000000E+00 | 1.000000E+00 | 1.000000E+00 |
| A3 | 0.000000E+00 | −6.784837E−06 | 2.196427E−05 | 1.195660E−05 | −1.149323E−05 | −1.143922E−06 |
| A4 | 2.212057E−06 | 1.073941E−05 | −1.784348E−05 | 8.656127E−07 | −3.692099E−07 | 8.049956E−10 |
| A5 | 0.000000E+00 | −6.120021E−07 | −3.189917E−07 | 2.476411E−08 | −3.237427E−07 | −3.487018E−10 |
| A6 | −8.509320E−07 | 2.983909E−08 | 1.875408E−07 | −4.076491E−11 | −4.237706E−09 | −1.612101E−10 |
| A7 | 0.000000E+00 | 2.765409E−09 | −2.501350E−08 | −6.934857E−11 | 2.612386E−09 | −2.141371E−11 |
| A8 | 1.827402E−11 | −7.300686E−11 | 1.241716E−09 | −6.189639E−12 | 7.725014E−11 | −1.924803E−12 |
| A9 | 0.000000E+00 | −1.754200E−11 | −2.534825E−13 | −3.333725E−13 | −2.592973E−11 | −1.269553E−13 |
| A10 | −1.356278E−13 | 5.200665E−13 | −1.369651E−12 | −3.716054E−15 | 1.087591E−12 | −4.597426E−15 |
| A11 | | 4.577131E−17 | 2.121105E−16 | −2.243534E−16 | 2.093262E−16 | 3.219858E−16 |
| A12 | | −1.519797E−16 | 1.643937E−17 | −1.434839E−17 | −8.269620E−18 | 9.836844E−17 |
| A13 | | −5.440776E−17 | 1.428068E−18 | −9.633478E−19 | −2.966776E−18 | 1.494300E−17 |
| A14 | | −1.137249E−17 | 1.494776E−19 | −8.031938E−20 | −4.355006E−19 | 1.856954E−18 |

FIG. 9 is a diagram showing spherical aberration, astigmatism, distortion, and lateral chromatic aberration at each of a wide angle end (WIDE), the middle of varying magnification (MID), and a telephoto end (TELE) of the zoom lens of Example 3.

The zoom lens of Example 3, which is constructed in such a manner, can have a high variable magnification ratio, and yet be compact and capable of high performance.

Example 4

FIGS. 5A and 5B show a zoom lens of Example 4. FIG. 5A illustrates the specific configuration of the zoom lens of Example 4. FIG. 5B is related to the zoom lens of Example 4, and illustrates a state in which the zoom setting is set to a wide angle end (as indicated by "WIDE" in the Figure) at the upper part and a state in which the zoom setting thereof is set to a telephoto end (as indicated by "TELE" in the Figure) at the bottom part. Further, arrows indicate the paths of movement of the lens groups, respectively when magnification is changed from the wide angle end to the telephoto end.

In the fifth lens group 5G of the zoom lens of Example 4, two lenses, i.e., a positive lens and a negative lens, are arranged in this order from the object side.

Further, Table 4A shows various data related to the zoom lens of Example 4. The upper part of Table 4A shows lens data, the middle part shows schematic specifications of the zoom lens, and the bottom part shows the focal length of each lens group.

TABLE 4A

EXAMPLE 4

| SURFACE NUMBER | Ri | Di | Nj | vj | GROUP STRUCTURE |
|---|---|---|---|---|---|
| 1 | 84.9463 | 1.950 | 1.84661 | 23.9 | FIRST GROUP |
| 2 | 62.2446 | 8.693 | 1.49700 | 81.5 | |
| 3 | ∞ | 0.100 | | | |
| 4 | 68.3452 | 4.363 | 1.60300 | 65.4 | |
| 5 | 153.8323 | D5 | | | |
| 6 | 89.2120 | 1.350 | 1.88300 | 40.8 | SECOND |
| 7 | 18.2963 | 8.233 | | | GROUP |
| 8 | −58.1632 | 1.000 | 1.88300 | 40.8 | |
| 9 | 67.7426 | 0.948 | | | |
| 10 | 37.5173 | 6.506 | 1.84661 | 23.9 | |
| 11 | −38.5206 | 0.408 | | | |

TABLE 4A-continued

EXAMPLE 4

| | | | | | |
|---|---|---|---|---|---|
| 12 | −33.7911 | 1.000 | 1.77250 | 49.6 | |
| 13 | 99.4178 | D13 | | | |
| (APERTURE STOP) 14 | ∞ | 1.000 | | | THIRD-a GROUP |
| 15 | 33.6716 | 3.293 | 1.51742 | 52.4 | |
| 16 | −58.3051 | 0.100 | | | |
| 17 | 28.2935 | 4.126 | 1.49700 | 81.5 | |
| 18 | −31.9738 | 0.900 | 1.83400 | 37.2 | |
| 19 | 127.3405 | 2.569 | | | |
| 20 | −68.3981 | 2.272 | 1.84661 | 23.9 | THIRD-b |
| 21 | −26.8082 | 0.886 | | | GROUP (OIS) |
| 22 | −24.8406 | 1.500 | 1.80348 | 40.4 | |
| *23 | 62.6811 | D23 | | | |
| *24 | 49.8918 | 4.452 | 1.51560 | 63.1 | FOURTH |
| *25 | −42.8733 | 0.100 | | | GROUP |
| 26 | 53.2553 | 1.000 | 1.80518 | 25.4 | |
| 27 | 23.3404 | 5.973 | 1.51823 | 58.9 | |
| 28 | −46.7603 | D28 | | | |
| 29 | −81.9572 | 2.357 | 1.80518 | 25.4 | FIFTH |
| 30 | −34.7267 | 1.493 | | | GROUP |
| *31 | −38.2183 | 1.500 | 1.80348 | 40.4 | |

TABLE 4A-continued

EXAMPLE 4

| *32 | 179.9979 | D33 | | | |
|---|---|---|---|---|---|
| 33 | ∞ | 4.900 | 1.51680 | 64.2 | Dg |
| 34 | ∞ | | | | |

| | WIDE | MID | TELE |
|---|---|---|---|
| D5 | 0.900 | 33.799 | 63.266 |
| D13 | 44.713 | 17.634 | 3.566 |
| D23 | 11.185 | 6.816 | 4.357 |
| D28 | 3.245 | 4.848 | 1.970 |
| D32 | 34.996 | 63.954 | 86.941 |
| f | 18.366 | 67.481 | 247.941 |
| Fno | 3.60 | 5.26 | 6.55 |
| 2ω[°] | 76.64 | 22.68 | 6.28 |
| $f_1$ | 107.872 | | |
| $f_2$ | −17.446 | | |
| $f_3$ | 116.489 | | |
| $f_4$ | 29.082 | | |
| $f_5$ | −85.750 | | |
| $f_{3a}$ | 37.832 | | |
| $f_{3b}$ (OIS) | −39.192 | | |

Table 4B shows aspheric coefficients of aspheric surfaces of the zoom lens of Example 4.

TABLE 4B

ASPHERIC COEFFICIENT

SURFACE NUMBER

| SIGN | *23 | *24 | *25 | *31 | *32 |
|---|---|---|---|---|---|
| K | 1.000000E+00 | 1.000000E+00 | 1.000000E+00 | 1.000000E+00 | 1.000000E+00 |
| A3 | 1.288744E−05 | 2.647809E−05 | 1.085607E−05 | −7.403052E−06 | −1.039624E−07 |
| A4 | −1.078292E−05 | −1.725827E−05 | 4.339778E−07 | −1.719981E−07 | −1.241135E−07 |
| A5 | 6.382901E−07 | −2.955264E−07 | 7.445503E−09 | −3.195104E−07 | −6.411543E−09 |
| A6 | −2.635804E−08 | 1.884390E−07 | −7.830304E−10 | −4.172605E−09 | −7.019777E−10 |
| A7 | −2.463874E−09 | −2.498717E−08 | −1.006144E−10 | 2.599459E−09 | −6.791905E−11 |
| A8 | 9.303492E−11 | 1.241227E−09 | −7.050127E−12 | 7.428064E−11 | −5.579190E−12 |
| A9 | 1.836592E−11 | −4.496962E−13 | −3.044782E−13 | −2.634935E−11 | −4.226272E−13 |
| A10 | −5.521081E−13 | −1.394620E−12 | 3.515842E−15 | 1.038713E−12 | −3.175412E−14 |
| A11 | −1.312550E−14 | −2.307759E−15 | 5.035691E−16 | −4.914561E−15 | −2.523663E−15 |
| A12 | −1.649716E−15 | −2.136162E−16 | 3.668331E−17 | −5.118335E−16 | −2.219919E−16 |
| A13 | −1.438455E−16 | −1.859723E−17 | 1.097923E−18 | −5.040249E−17 | −2.163300E−17 |
| A14 | −6.585779E−18 | −1.568050E−18 | −1.859078E−19 | −4.774574E−18 | −2.263951E−18 |
| A15 | −4.147342E−19 | −2.121945E−20 | −2.309610E−19 | −5.390733E−19 | −6.968129E−19 |
| A16 | 1.147946E−19 | 8.062655E−21 | −3.078231E−20 | −4.101269E−20 | −8.198580E−20 |

FIG. 10 is a diagram showing spherical aberration, astigmatism, distortion, and lateral chromatic aberration at each of a wide angle end (WIDE), the middle of varying magnification (MID), and a telephoto end (TELE) of the zoom lens of Example 4.

The zoom lens of Example 4, which is constructed in such a manner, can have a high variable magnification ratio, and yet be compact and capable of high performance.

Example 5

FIGS. 6A and 6B show a zoom lens of Example 5. FIG. 6A illustrates the specific configuration of the zoom lens of Example 5. FIG. 6B is related to the zoom lens of Example 5, and illustrates a state in which the zoom setting is set to a wide angle end (as indicated by "WIDE" in the Figure) at the upper part and a state in which the zoom setting thereof is set to a telephoto end (as indicated by "TELE" in the Figure) at the bottom part. Further, arrows indicate the paths of movement of the lens groups, respectively when magnification is changed from the wide angle end to the telephoto end.

In the fifth lens group 5G of the zoom lens of Example 5, two lenses, i.e., a positive lens and a negative lens, are arranged in this order from the object side.

Further, Table 5A shows various data related to the zoom lens of Example 5. The upper part of Table 5A shows lens data, the middle part shows schematic specifications of the zoom lens, and the bottom part shows the focal length of each lens group.

TABLE 5A

EXAMPLE 5

| SURFACE NUMBER | Ri | Di | Nj | vj | GROUP STRUCTURE |
|---|---|---|---|---|---|
| 1 | 85.2992 | 2.520 | 1.84661 | 23.9 | FIRST GROUP |
| 2 | 61.8500 | 9.114 | 1.49700 | 81.5 | |
| 3 | −2375.7864 | 0.100 | | | |
| 4 | 66.8941 | 4.269 | 1.60300 | 65.4 | |
| 5 | 146.5034 | D5 | | | |
| 6 | 87.8998 | 1.400 | 1.88300 | 40.8 | SECOND GROUP |
| 7 | 18.3570 | 8.315 | | | |
| 8 | −51.0001 | 1.050 | 1.83481 | 42.7 | |
| 9 | 63.6139 | 0.815 | | | |

TABLE 5A-continued

EXAMPLE 5

| 10 | 37.4113 | 6.407 | 1.84666 | 23.8 | |
|---|---|---|---|---|---|
| 11 | −37.4113 | 0.388 | | | |
| 12 | −32.5753 | 1.050 | 1.77250 | 49.6 | |
| 13 | 98.4906 | D13 | | | |
| (APERTURE STOP) 14 | ∞ | 1.100 | | | THIRD-a GROUP |
| 15 | 34.2381 | 3.329 | 1.54814 | 45.8 | |
| 16 | −60.1143 | 0.937 | | | |
| 17 | 27.0475 | 4.232 | 1.49700 | 81.5 | |
| 18 | −33.1140 | 0.900 | 1.85026 | 32.3 | |
| 19 | 163.6420 | 3.836 | | | |
| *20 | −63.3026 | 1.500 | 1.80168 | 40.7 | THIRD-b GROUP (OIS) |
| *21 | 24.7365 | 0.864 | | | |
| 22 | 28.0299 | 2.277 | 1.84666 | 23.8 | |
| 23 | 66.7227 | D23 | | | |
| *24 | 52.7776 | 4.675 | 1.51530 | 62.8 | FOURTH GROUP |
| *25 | −42.2885 | 0.105 | | | |
| 26 | 48.3349 | 1.050 | 1.75520 | 27.5 | |
| 27 | 23.5950 | 5.625 | 1.48749 | 70.2 | |
| 28 | −52.9320 | D28 | | | |
| 29 | −77.2285 | 2.360 | 1.80518 | 25.4 | FIFTH |

TABLE 5A-continued

EXAMPLE 5

| | | | | | |
|---|---|---|---|---|---|
| 30 | −34.0317 | 1.053 | | | GROUP |
| *31 | −38.4236 | 1.500 | 1.80168 | 40.7 | 5 |
| *32 | 175.0302 | D32 | | | |
| 33 | ∞ | 5.200 | 1.51680 | 64.2 | Dg |
| 34 | ∞ | | | | |

| | WIDE | MID | TELE |
|---|---|---|---|
| D5 | 0.900 | 36.423 | 62.766 |
| D13 | 43.473 | 17.944 | 3.610 |
| D23 | 10.708 | 6.338 | 3.715 |
| D28 | 3.842 | 5.548 | 1.698 |
| D32 | 33.106 | 58.073 | 84.416 |
| f | 18.389 | 67.564 | 248.247 |
| Fno | 3.62 | 5.02 | 6.39 |
| 2ω[°] | 76.66 | 22.61 | 6.27 |
| $f_1$ | 106.443 | | |
| $f_2$ | −16.902 | | |
| $f_3$ | 94.599 | | |
| $f_4$ | 29.607 | | |
| $f_5$ | −84.036 | | |
| $f_{3a}$ | 34.301 | | |
| $f_{3b}$ (OIS) | −36.710 | | |

Table 5B shows aspheric coefficients of aspheric surfaces of the zoom lens of Example 5.

TABLE 5B

ASPHERIC COEFFICIENT

| | SURFACE NUMBER | | | | | |
|---|---|---|---|---|---|---|
| SIGN | *20 | *21 | *24 | *25 | *31 | *32 |
| K | 1.000000E+00 | 1.000000E+00 | 1.000000E+00 | 1.000000E+00 | 1.000000E+00 | 1.000000E+00 |
| A3 | −6.165192E−06 | 1.136414E−06 | 2.646484E−05 | 1.455922E−05 | −5.608010E−06 | 3.111280E−07 |
| A4 | 1.180918E−05 | −2.391292E−07 | −1.700884E−05 | 3.247792E−07 | −6.243737E−08 | −1.509737E−07 |
| A5 | −5.712797E−07 | −9.755106E−09 | −2.879359E−07 | 3.790736E−09 | −3.186333E−07 | −4.800208E−09 |
| A6 | 3.004106E−08 | −5.784070E−11 | 1.882504E−07 | −7.189621E−10 | −4.429101E−09 | −6.392048E−10 |
| A7 | 2.628840E−09 | 1.065292E−11 | −2.503214E−08 | −8.915027E−11 | 2.562357E−09 | −8.139704E−11 |
| A8 | −9.058174E−11 | −1.062813E−12 | 1.237303E−09 | −6.929168E−12 | 6.993044E−11 | −8.143708E−12 |
| A9 | −1.916284E−11 | −4.032273E−13 | −6.914544E−13 | −4.165896E−13 | −2.683328E−11 | −7.108067E−13 |
| A10 | 3.931210E−13 | −6.248737E−14 | −1.404954E−12 | −1.706208E−14 | 9.877237E−13 | −5.801155E−14 |
| A11 | −8.205763E−15 | −6.993822E−15 | −2.471879E−15 | −2.065580E−15 | −9.923479E−15 | −4.652135E−15 |
| A12 | −6.918798E−16 | −6.032048E−16 | −2.028307E−16 | −2.332995E−16 | −9.630020E−16 | −3.833882E−16 |
| A13 | −6.145538E−17 | −3.361798E−17 | −2.032344E−17 | −2.430529E−17 | −8.645582E−17 | −3.363706E−17 |
| A14 | −3.613976E−18 | 8.786762E−19 | −2.491248E−18 | −2.366453E−18 | −7.105990E−18 | −3.193681E−18 |
| A15 | 1.528779E−18 | 6.479148E−19 | −2.276198E−19 | −4.001489E−19 | −6.139199E−19 | −7.773001E−19 |
| A16 | 3.702179E−19 | 1.315589E−19 | −2.724708E−20 | −4.204166E−20 | −3.018856E−20 | −9.005424E−20 |

FIG. 11 is a diagram showing spherical aberration, astigmatism, distortion, and lateral chromatic aberration at each of a wide angle end (WIDE), the middle of varying magnification (MID), and a telephoto end (TELE) of the zoom lens of Example 5.

The zoom lens of Example 5, which is constructed in such a manner, can have a high variable magnification ratio, and yet be compact and capable of high performance.

The above zoom lens may have the following configuration. All of the zoom lenses of the above Reference Example 1 and Examples 2 through 5 are assumed to have the configuration as shown below.

That is, it is desirable for the above zoom lens to satisfy formula (D): $0.10 < f_w/f_1 < 0.25$, where $f_w$ is the focal length of the entire lens system at a wide angle end, f1 is the focal length of the first lens group 1G; and more desirably, formula (D'): $0.15 < f_w/f_1 < 0.20$.

Formula (D) regulates the ratio of the focal length of the entire lens system at a wide angle end to the focal length of the first lens group 1G. If the zoom lens is constructed in such a manner that the value of $f_w/f_1$ is less than the lower limit defined by formula (D), the focal length of the first lens group 1G becomes too large, which causes a problem that the outer diameters of the lenses of the first lens group 1G and the total length of the optical system will become great at a telephoto end. If the zoom lens is constructed in such a manner that the value of $f_w/f_1$ exceeds the upper limit defined by formula (D), positive refractive power of the first lens group 1G becomes too strong, which will cause a problem that it becomes difficult to maintain optical performance at the telephoto end.

Further, it is desirable for the zoom lens to satisfy formula (F): $-1.5 < f_w/f_2 < -0.5$, and more desirably, formula (F'): $-1.2 < f_w/f_2 < -1.0$, where $F_2$ is the focal length of a second lens group 2G.

Formula (F) regulates the ratio of the focal length of the entire lens system at a wide angle end to the focal length of the second lens group 2G. If the zoom lens is constructed in such a manner that the value of $f_w/f_2$ is lower than the lower limit defined by formula (F), negative refractive power of the second lens group 2G will be excessively increased, which will cause a problem that the curvature of image field of a peripheral image will become large. Further, a problem of difficulties in maintaining optical performance when magnification

TABLE 6

| | REFERENCE EXAMPLE 1 | EXAMPLE 2 | EXAMPLE 3 | EXAMPLE 4 | EXAMPLE 5 |
|---|---|---|---|---|---|
| FORMULA (A) | 19.5 | 15.3 | 16.5 | 15.0 | 15.3 |
| FORMULA (B) | 1.803 | 1.802 | 1.803 | 1.803 | 1.802 |
| FORMULA (C) | −5.00 | −3.32 | −3.99 | −3.30 | −3.30 | is varied will also occur. If the zoom lens is constructed in such a manner that the value of $f_w/f_2$ exceeds the upper limit defined by formula (F), negative refractive power of the second lens group 2G will be excessively reduced, which will increase the amount of movement of the first lens group 1G when magnification is varied. This will cause a problem that the outer diameters of the lenses of the first lens group 1G and the total length of the optical system will become great at the telephoto end.

Further, it is desirable for the zoom lens to satisfy formula (H): $0.10<f_w/f_3<0.50$, and more desirably, formula (H'): $0.15<f_w/f_3<0.30$, where $f_3$ is the focal length of a third lens group 3G.

Formula (H) regulates the ratio of the focal length of the entire lens system at a wide angle end to the focal length of the third lens group 3G. If the zoom lens is constructed in such a manner that the value of $f_w/f_3$ is lower than the lower limit defined by formula (H), positive refractive power of the third lens group 3G will be excessively reduced, which will increase the amount of shift of the third lens group 3G when magnification is varied. This causes a problem that the total length of the optical system grows to a large size. If the zoom lens is constructed in such a manner that the value of $f_w/f_3$ exceeds the upper limit defined by formula (H), positive refractive power of the third lens group 3G will be excessively increased. This will cause a problem of difficulties in maintaining optical performance when magnification is varied.

Further, it is desirable for the zoom lens to satisfy formula (J): $0.50<f_w/f_4<0.50$ and formula (K): $-0.32<f_w/f_5<-0.15$ at the same time, and more desirably, formula (I'): $0.60<f_w/f_4<0.65$ and/or formula (K'): $-0.32<f_w/f_5<-0.20$, where $f_4$ is the focal length of a third lens group 4G.

Formula (J) regulates the ratio of the focal length of the entire lens system at a wide angle end to the focal length of the fourth lens group 4G. If the zoom lens is constructed in such a manner that the value of $f_w/f_4$ is lower than the lower limit defined by formula (J), positive refractive power of the fourth lens group 4G will be excessively reduced, which will increase the amount of shift of the fourth lens group 4G when magnification is varied. This will cause a problem that the total length of the optical system will become great. If the zoom lens is constructed in such a manner that the value of $f_w/f_4$ exceeds the upper limit defined by formula (H), positive refractive power of the fourth lens group 4G will be excessively increased. This will cause a problem of difficulties in maintaining optical performance when magnification is varied.

Formula (K) regulates the ratio of the focal length of the entire lens system at a wide angle end to the focal length of the fifth lens group 5G. If the zoom lens is constructed in such a manner that the value of $f_w/f_5$ is lower than the lower limit defined by formula (K), negative refractive power of the firth lens group 5G will be excessively increased, which causes a problem that the back focus length will becomes longer and the entire length of the optical system will become great. If the zoom lens is constructed in such a manner that the value of $f_w/f_5$ exceeds the upper limit defined by formula (K), negative refractive power of the fifth lens group 5G will be excessively reduced, which will diminish the back focus length. This will cause a problem that spaces for a mirror of a single-lens reflex camera, a filter, and the like cannot be secured, for example. In addition, the amount of shift of the fifth lens group 5G will be increased at the time of focus, and further the outer diameters of the lenses of the first lens group 1G will become great. This increases the burden on the focusing mechanism so that it will become difficult to achieve high-speed focus, for example.

Note that the third lens group 3G consists of a third-a lens group 3Ga having positive refractive power and a third-b lens group 3Gb having negative refractive power, which are arranged in this order from the object side. Further, the third lens group 3G may be constructed in such a manner that only the third-b lens group 3Gb is moved in a direction perpendicular to the optical axis to achieve camera shake correction.

It is desirable for the zoom lens to satisfy formula (M): $-2.00<f_{3a}/f_{3b}<-0.85$, and more desirably, formula (M'): $-1.00<f_{3a}/f_{3b}<-0.85$, where $f_{3a}$ is the focal length of the third-a lens group 3Ga, and $f_{3b}$ is the focal length of the third-b lens group 3Gb.

Formula (M) regulates the ratio of the focal length of the third-a lens group 3Ga to the focal length of the third-b lens group 3Gb. If the zoom lens 100 is constructed in such a manner that the value of $f_{3a}/f_{3b}$ is lower than the lower limit defined by formula (M) the negative refractive power of the third-b lens group 3Gb will increase, so that the amount of shift of the third-b lens group 3Gb in a direction perpendicular to the optical axis, which is necessary for the camera shake correction, will be excessively reduced. This will cause a problem that it becomes difficult to control the camera shake correction group (the third-b lens group 3Gb) against microvibration. If the zoom lens is constructed in such a manner that the value of $f_{3a}/f_{3b}$ exceeds the upper limit defined by formula (M), the negative refractive power of the third-b lens group 3Gb will be diminished and the amount of shift of the third-b lens group 3Gb necessary for the camera shake correction will be excessively increased, which causes a problem that a size of the camera shake correction mechanism will become great.

The third-b lens group 3Gb may consist of one negative lens and one positive lens.

The third-b lens group 3Gb consists of two single lenses and has at least one aspheric surface.

The present invention is not limited to the embodiments and the examples described above, and various modifications are possible. For example, values, such as the radius of curvature of each lens element, distances between surfaces, and refractive indices, are not limited to the values in the numerical examples shown in the Tables, but may be other values.

What is claimed is:

1. A zoom lens, substantially consisting of:
   a first lens group having positive refractive power;
   a second lens group having negative refractive power;
   a third lens group having positive refractive power;
   a fourth lens group having positive refractive power; and
   a fifth lens group having negative refractive power, which
      are arranged in this order from an object side of the zoom lens,
   wherein when varying magnification from a wide angle end to a telephoto end, a distance between the first lens group and the second lens group is consistently increased, a distance between the second lens group and the third lens group is consistently decreased, a distance between the third lens group and the fourth lens group is consistently decreased, and a distance between the fourth lens group and the fifth lens group is changed, while all of the lens groups are moved with respect to an image formation position,
   wherein when moving a point of focus from an infinity side to a near side to achieve focus, only the fifth lens group is moved from the object side to the image side,
   wherein the fifth lens group has at least one lens having negative refractive power and at least one lens having positive refractive power, and wherein the following formula (Ca) is satisfied:

$$-3.99 \le 1\beta_{5T}^2 - 3.30, \text{ where}$$

$\beta_{5T}$: an image formation magnification of the fifth lens group when focusing on infinity at the telephoto end.

2. The zoom lens as defined in claim 1, wherein the fifth lens group 5G is constructed of a positive lens and a negative lens, which are arranged in this order from the object side.

3. An imaging apparatus comprising:
the zoom lens as defined in claim 1.

4. The zoom lens as defined in claim 1, wherein the fifth lens group 5G has at least one aspheric surface, and wherein the following formula (A) and (B) are satisfied at the same time:

$$10 < \nu_{5n} - \nu_{5p} < 30 \qquad \text{(A); and}$$

$$1.77 < N_{5n} \qquad \text{(B), where}$$

$\nu_{5n}$: an average value of Abbe number (based on d-line) of each of lenses having negative refractive power, which constitute the fifth lens group $\nu_{5p}$: an average number of Abbe number (based on the d-line) of each of lenses having positive refractive power, which constitute the fifth lens group, and $N_{5n}$: an average number of refractive index (the d-line) of each of lenses having negative refractive power, which constitute the fifth lens group.

5. The zoom lens as defined in claim 4, wherein the following formula (B') is satisfied: $1.79 < N_{5n}$ (B').

6. The zoom lens as defined in claim 4, wherein the fifth lens group 5G is constructed of a positive lens and a negative lens, which are arranged in this order from the object side.

7. The zoom lens as defined in claim 4, wherein the following formula (B') is satisfied:

$$1.79 < N_{5n} \qquad \text{(B')}.$$

8. The zoom lens as defined in claim 7, wherein the fifth lens group 5G is constructed of a positive lens and a negative lens, which are arranged in this order from the object side.

9. The zoom lens as defined in claim 4, wherein the following formula (A') is satisfied:

$$12 < \nu_{5n} - \nu_{5p} < 25 \qquad \text{(A')}.$$

10. The zoom lens as defined in claim 9, wherein the following formula (B') is satisfied: $1.79 < N_{5n}$ (B').

11. The zoom lens as defined in claim 9, wherein the fifth lens group 5G is constructed of a positive lens and a negative lens, which are arranged in this order from the object side.

* * * * *